(12) United States Patent
Yoshida

(10) Patent No.: US 12,320,924 B2
(45) Date of Patent: Jun. 3, 2025

(54) MEASURING DEVICE AND METHOD OF INSTALLING MEASURING DEVICE

(71) Applicant: Mitsubishi Electric Corporation, Tokyo (JP)

(72) Inventor: Mitsunobu Yoshida, Tokyo (JP)

(73) Assignee: MITSUBISHI ELECTRIC CORPORATION, Tokyo (JP)

(*) Notice: Subject to any disclaimer, the term of this patent is extended or adjusted under 35 U.S.C. 154(b) by 994 days.

(21) Appl. No.: 17/263,909

(22) PCT Filed: Sep. 7, 2018

(86) PCT No.: PCT/JP2018/033239
§ 371 (c)(1),
(2) Date: Jan. 28, 2021

(87) PCT Pub. No.: WO2020/049726
PCT Pub. Date: Mar. 12, 2020

(65) Prior Publication Data
US 2021/0231777 A1    Jul. 29, 2021

(51) Int. Cl.
*G01S 7/48* (2006.01)
*G01S 7/481* (2006.01)

(52) U.S. Cl.
CPC .................. *G01S 7/4813* (2013.01)

(58) Field of Classification Search
None
See application file for complete search history.

(56) References Cited

U.S. PATENT DOCUMENTS

| | | | |
|---|---|---|---|
| 2009/0138233 A1* | 5/2009 | Kludas | G01S 17/89 |
| | | | 382/254 |
| 2014/0104416 A1* | 4/2014 | Giordano | G01B 11/026 |
| | | | 348/135 |
| 2014/0285375 A1* | 9/2014 | Crain | G01S 17/86 |
| | | | 342/25 A |
| 2018/0059250 A1* | 3/2018 | Nakata | G01S 19/46 |
| 2019/0056223 A1 | 2/2019 | Ishihara | |
| 2019/0361094 A1* | 11/2019 | Harris | G01S 17/89 |

FOREIGN PATENT DOCUMENTS

| | | |
|---|---|---|
| JP | 10-205691 A | 8/1998 |
| JP | 2014-177951 A | 9/2014 |
| JP | 2017-116406 A | 6/2017 |
| WO | 2017/163640 A1 | 9/2017 |

OTHER PUBLICATIONS

International Search Report and Written Opinion mailed on Oct. 16, 2018, received for PCT Application PCT/JP2018/033239, Filed on Sep. 7, 2018, 6 pages including English Translation.

* cited by examiner

*Primary Examiner* — Hovhannes Baghdasaryan
(74) *Attorney, Agent, or Firm* — XSENSUS LLP

(57) ABSTRACT

In a measuring device, a position of a laser scanner on a top plate (201) of a housing has been decided by pins (220) and a fixing member (210), and the laser scanner has been attached to the housing, and also the laser scanner that has been in a attached state can be detached, and again the position on the top plate (201) can be decided by the pins (220) and the fixing member (210), and the laser scanner can be attached to the top plate (201).

13 Claims, 24 Drawing Sheets

MEASURING DEVICE AND METHOD OF INSTALLING MEASURING DEVICE

CROSS-REFERENCE TO RELATED APPLICATION

The present application is based on PCT filing PCT/JP2018/033239, filed Sep. 7, 2018, the entire contents of which are incorporated herein by reference.

TECHNICAL FIELD

The present invention relates to a measuring device used for a mobile mapping system and a method of installing the measuring device.

BACKGROUND ART

<Mounting Capability of Measuring Device>

A vehicle on which a measuring device for a mobile mapping system is mounted usually has two people on board, and operation is carried out by the two people.

The measuring device is mounted on a roof of the vehicle, but when a small-sized measuring device is mounted on the roof of the vehicle, it is desirable that the measuring device can be mounted by the two people.

However, even if the measuring device is a small size, in many cases, a total weight is 50 kg, and considering gravitational acceleration, it exceeds 490 N. Therefore, it has been a laborious work for the two people to lift up the measuring device to the roof of the vehicle (weight per person exceeds 25 kg).

For this reason, there exists a measuring device whose control part is mounted inside the vehicle by separating a sensor part such as a laser scanner and an image pickup device from the control part such as an information processing device that processes measurement information of the sensor part and stores processed data.

However, there has been also some inconveniences such as a large number of cables being required for connecting the sensor part and the control part.

Therefore, there is a demand for efficiently distributing the weight of the measuring device and improving mounting capability of the measuring device on the vehicle.

<Replacement of Optical Sensor Device>

There are some cases in which a different optical sensor device is mounted on the measuring device as necessary.

For example, the cases are when a high-precision laser scanner is mounted for precision measurement for measuring accurate unevenness and when a normal-precision laser scanner is mounted for measurement that does not require high precision.

That is, there is a demand for replacing the optical sensor device with another optical sensor device.

Further, as one aspect of replacement, there is a desire to change an angle of the mounted laser scanner.

That is, there is a desire to change the angle even when the same sensor is used.

CITATION LIST

Patent Literature

Patent Literature 1: JP2017-116406A

SUMMARY OF INVENTION

Technical Problem

Patent Literature 1 discloses a configuration in which in the measuring device used for the mobile mapping system, an antenna for receiving a signal emitted by a navigation satellite can be attached to and detached from a housing.

However, a weight of the antenna is not heavy enough to improve the above-mentioned mounting capability. Further, Patent Literature 1 does not disclose that an optical sensor device, such as a laser scanner and an image pickup device, is attached to and detached from, or changed on a main body of the measuring device to which an inertial device is fixed.

Further, in optical sensor devices such as a laser scanner and an image pickup device, parameter correction of a posture direction (sensor angle) is carried out so that each line-of-sight direction which is reference becomes a pre-measured and predetermined posture direction (sensor angle) with respect to a local coordinate system virtually fixed to the main body of the measuring device.

When the optical sensor device is attached to and detached from, or changed on the main body of the measuring device, there is a challenge that the posture direction of the optical sensor device with respect to the main body of the measuring device cannot be kept in a same direction and thus reproducibility of sensor measurement data and measurement accuracy deteriorate.

Further, in order to maintain the reproducibility of the sensor measurement data, it is necessary for the user to perform the parameter correction work on the posture direction every time the optical sensor device is attached and detached, or changed. Thus, it has been inconvenient.

The present invention aims to improve mounting capability of a measuring device. Also, the present invention aims to maintain reproducibility of sensor measurement data and measurement accuracy when an optical sensor device is attached and detached, or changed.

Solution to Problem

A measuring device of the present invention includes:
an optical sensor device;
an information processing device to process information output by the optical sensor device; and
a housing that has a position deciding member and at which the optical sensor device and the information processing device are arranged, and
wherein a position of the optical sensor device at the housing has been decided by the position deciding member, and the optical sensor device has been attached to the housing, and also the optical sensor device that has been in an attached state can be detached, and again the position at the housing can be decided by the position deciding member, and the optical sensor device can be attached to the housing.

Advantageous Effects of Invention

Since a measuring device of the present invention includes a position deciding member, it is possible to improve the above-mentioned mounting capability of the measuring device. Further, since the measuring device of the present invention includes the position deciding member, it is possible to ensure maintenance of reproducibility of sensor measurement data and measurement accuracy when an optical sensor is attached and detached, or changed.

DESCRIPTION OF EMBODIMENTS

Figure 1:
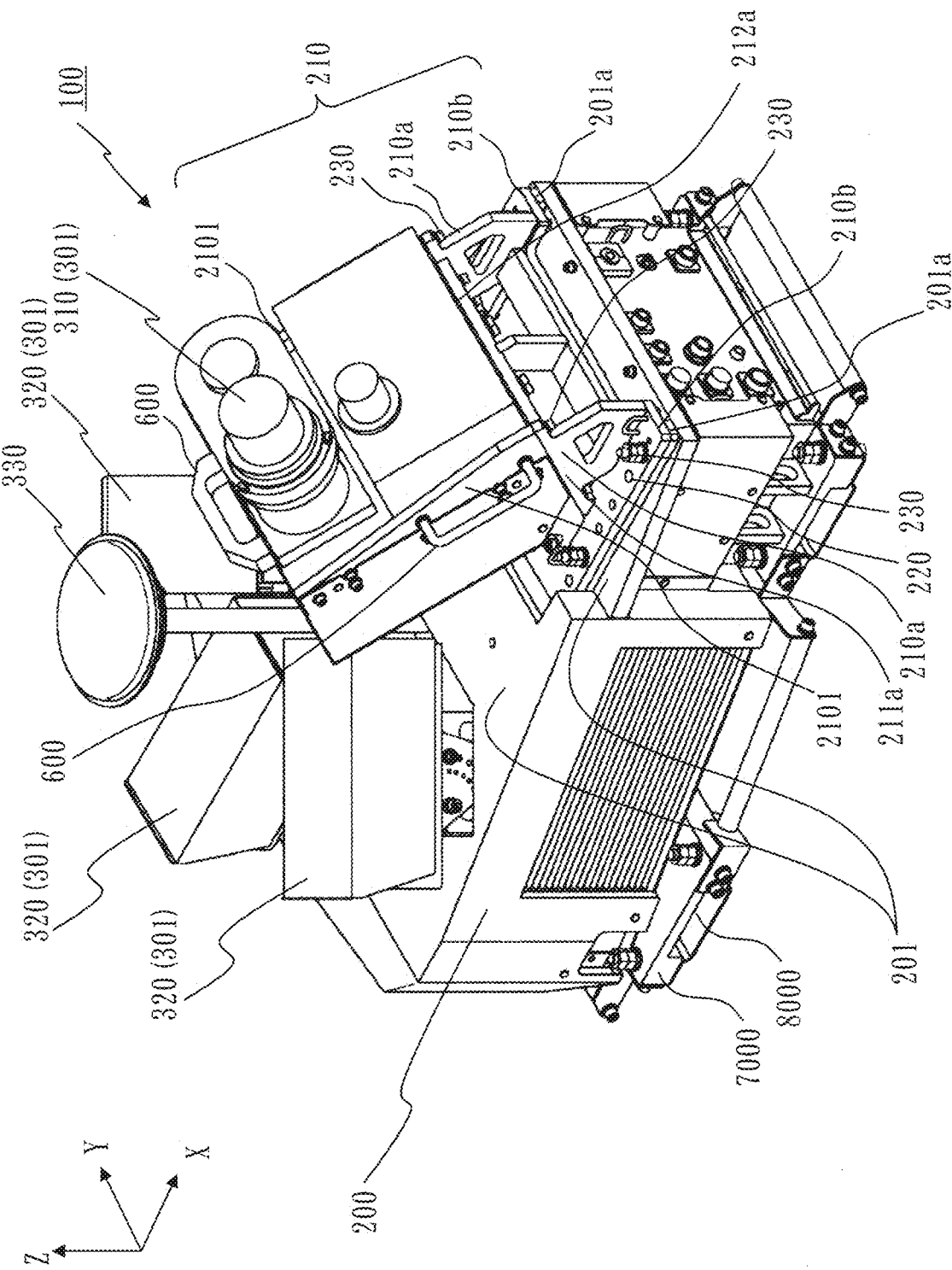
FIG. 1 is a perspective view diagram of a measuring device 100, which is a diagram of a first embodiment.

Hereinafter, embodiments of the present invention will be described with reference to the drawings. Besides, in each drawing, the same reference numerals are assigned to the same or corresponding parts. In descriptions of the embodiments, the descriptions of the same or corresponding parts are omitted or simplified appropriately.

First Embodiment

Description of Configuration

A measuring device 100 of a first embodiment will be described with reference to FIGS. 1 to 22. There is a system that measures shapes of surfaces of features such as: buildings around a road; and a road, by a vehicle having an image pickup device and laser scanner mounted and traveling in the city. This system is referred to as a mobile mapping system.

The measuring device 100 is a device used for the mobile mapping system.

The measuring device 100 is mounted on, detachably held on, and fixed to a carrier provided on a vehicle 500 which is a moving body.

FIGS. 1 to 8 illustrate appearance of the measuring device 100 on which an attachment angle of a laser scanner 310 is 45 degrees. The measuring device 100 includes: the laser scanner 310 and one or three image pickup devices 320 which are constituting an optical sensor device; an inertial device 401; a receiving device 402; an information processing device 403; and a housing 200. The weight of the laser scanner 310, including fixing members 2101 and 210a, is about 20 kg (196 N), and is acceptable to be about 15 kg (147 N) to 30 kg (294 N).

The laser scanner 310 is directly held by the fixing member 2101. The fixing member 2101 has a gate form frame shape. On the fixing member 2101, handles 600 are attached to an upper surface and side surfaces of an upper bridge girder, and a bottom surface part which is bent in a way of protruding outward is provided on a bottom surface. The bottom surface part, not illustrated, of the fixing member 2101 is attached to another fixing member 210a, and is fastened and fixed to the fixing member 210a by a fastening member. The fixing member 210a is attached to yet another fixing member 210b, and is fastened and fixed by the fastening member. The fixing member 210b is fixed to a laser attachment pedestal 201a of a top plate 201 of the housing 200.

Further, as described later, it is possible to change an attachment angle of the laser scanner 310 from 45 degrees to 90 degrees by changing attachment fixing parts in a way of: detaching the fixing member 210a; directly attaching to another fixing member 210b, the bottom surface part, not illustrated, of the fixing member 2101 which is fixing the laser scanner 310; and fastening and fixing the bottom surface part. Besides, when the fixing member 2101 is directly attached to the fixing member 210b, the attachment is carried out after the fixing member 210b is detached from the top plate 201. That is, the fixing member 210b is directly fixed to the fixing member 2101 that holds the laser scanner 310 at 90 degrees, and then is fixed to the laser attachment pedestal 201a on the top plate 201.

Figure 5:
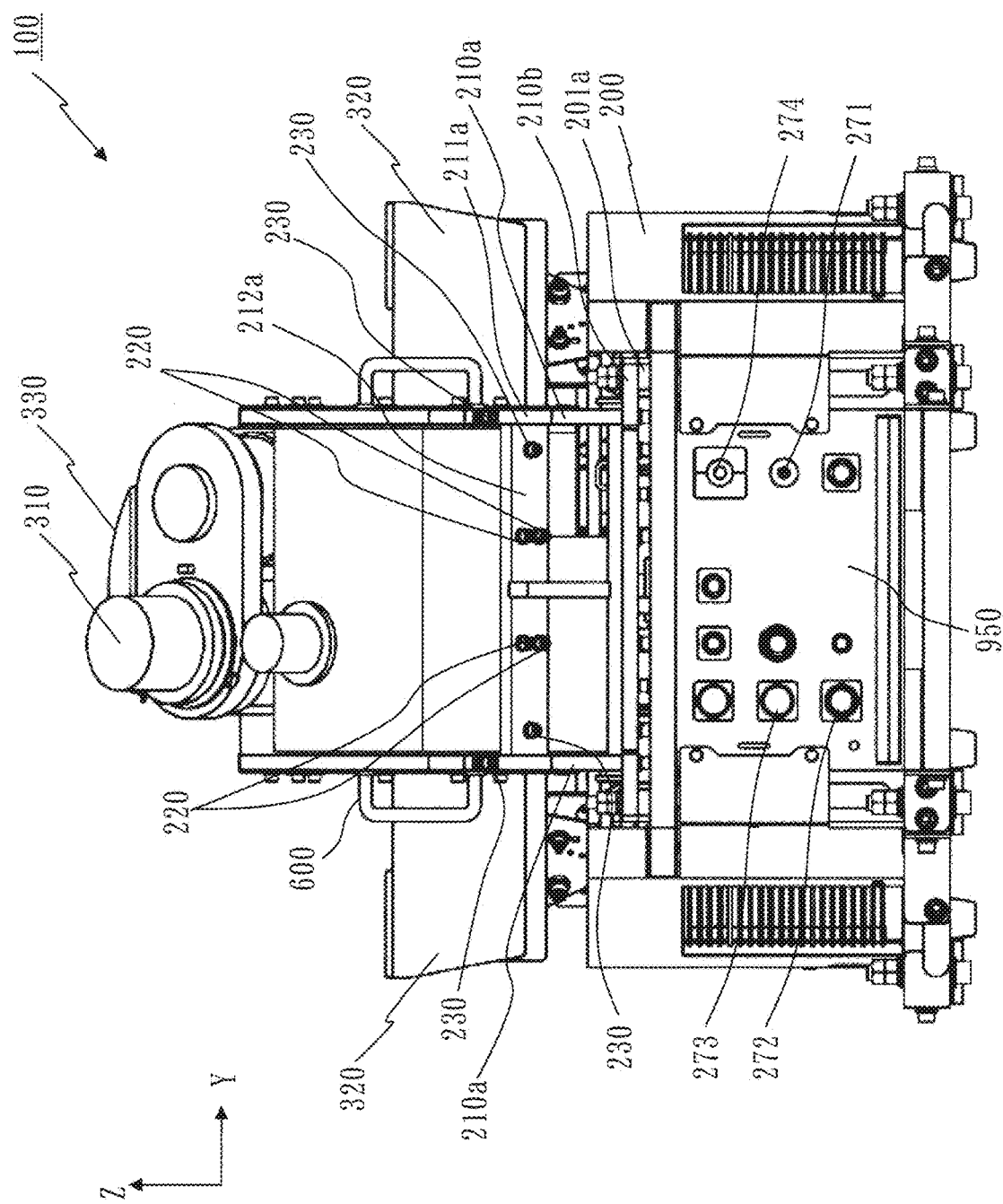
FIG. 5 is a back-side view diagram of the measuring device 100, which is a diagram of the first embodiment.

Here, the bottom surface part, not illustrated, of the fixing member 2101 is arranged so as to face plate-shaped members 211a (FIG. 1) and 212a (FIG. 5) which are constituent members of the fixing member 210a. As illustrated in FIGS. 2 and 5, the bottom surface part of the fixing member 2101 is fixed to the members 211a and 212a with pins 220 and screws 230.

On the contrary, by reattaching the detached fixing member 210a to the bottom surface part of the fixing member 2101, it is possible to return the attachment angle of the laser scanner 310 from 90 degrees to 45 degrees. That is, the fixing member 210b is fixed to the laser attachment pedestal 201a of the top plate 201 after the fixing member 210a directly fixes the fixing member 2101, which holds the laser scanner 310 at 45 degrees, and the fixing member 210a is fixed to the fixing member 210b.

The angles of 45 degrees and 90 degrees are examples, and a fixing member that holds the laser scanner 310 at 60 degrees is also acceptable to be used. The angles of 45 degrees, 60 degrees, and 90 degrees with respect to the top plate 201 are examples, and the angles are not limited to these. This direct fixing may be carried out by inserting a spacer thin plate between the bottom surface part of the fixing member 2101 and the fixing member 210a or 210b.

Further, as described later, it is possible to change the attachment angle of the laser scanner 310 from 90 degrees to 60 degrees or from 60 degrees to 90 degrees by rotating the laser scanner 310 centering on an axis. The fixing member 210 that changes the attachment angle of the laser scanner 310 by rotating the laser scanner 310 centering on the axis is represented as a fixing member 210c.

Besides, the angles of 45 degrees, 60 degrees, and 90 degrees with respect to the top plate 201 are examples, and the angles are not limited to these.

For example, it is also acceptable to change the attachment angle of the laser scanner 310 from 90 degrees to 60 degrees by changing the fixing member 210b to another fixing member 210d, attaching to the fixing member 210d, the bottom surface part of the fixing member 2101 that fixes the laser scanner 310, and fastening and directly fixing the bottom surface part. On the contrary, it is possible to return the attachment angle of the laser scanner 310 from 60 degrees to 90 degrees by changing the fixing member 210d to the fixing member 210b and reattaching the fixing member 210b to the bottom surface part of the fixing member 2101.

Hereinafter, when it is described as 45 degrees, 60 degrees, or 90 degrees, it means the attachment angle of the laser scanner 310.

Figure 2:
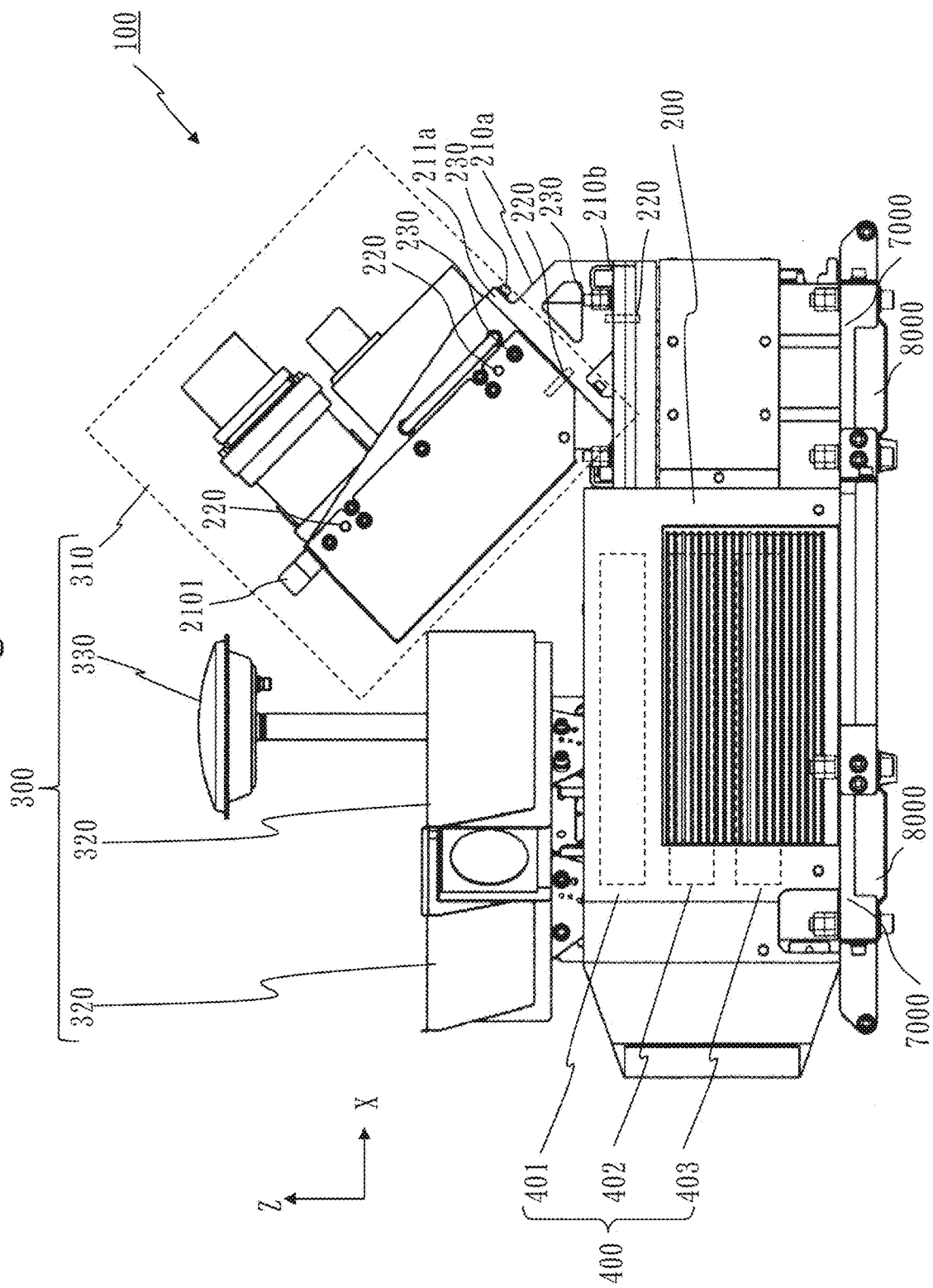
FIG. 2 is a left-side view diagram of the measuring device 100, which is a diagram of the first embodiment.

FIG. 1 is a perspective view diagram of the measuring device 100.

XYZ coordinates are set in FIG. 1.

FIGS. 2 to 8 illustrate two axes of XYZ coordinates.

FIG. 2 is a left-side view diagram of the measuring device 100.

Figure 3:
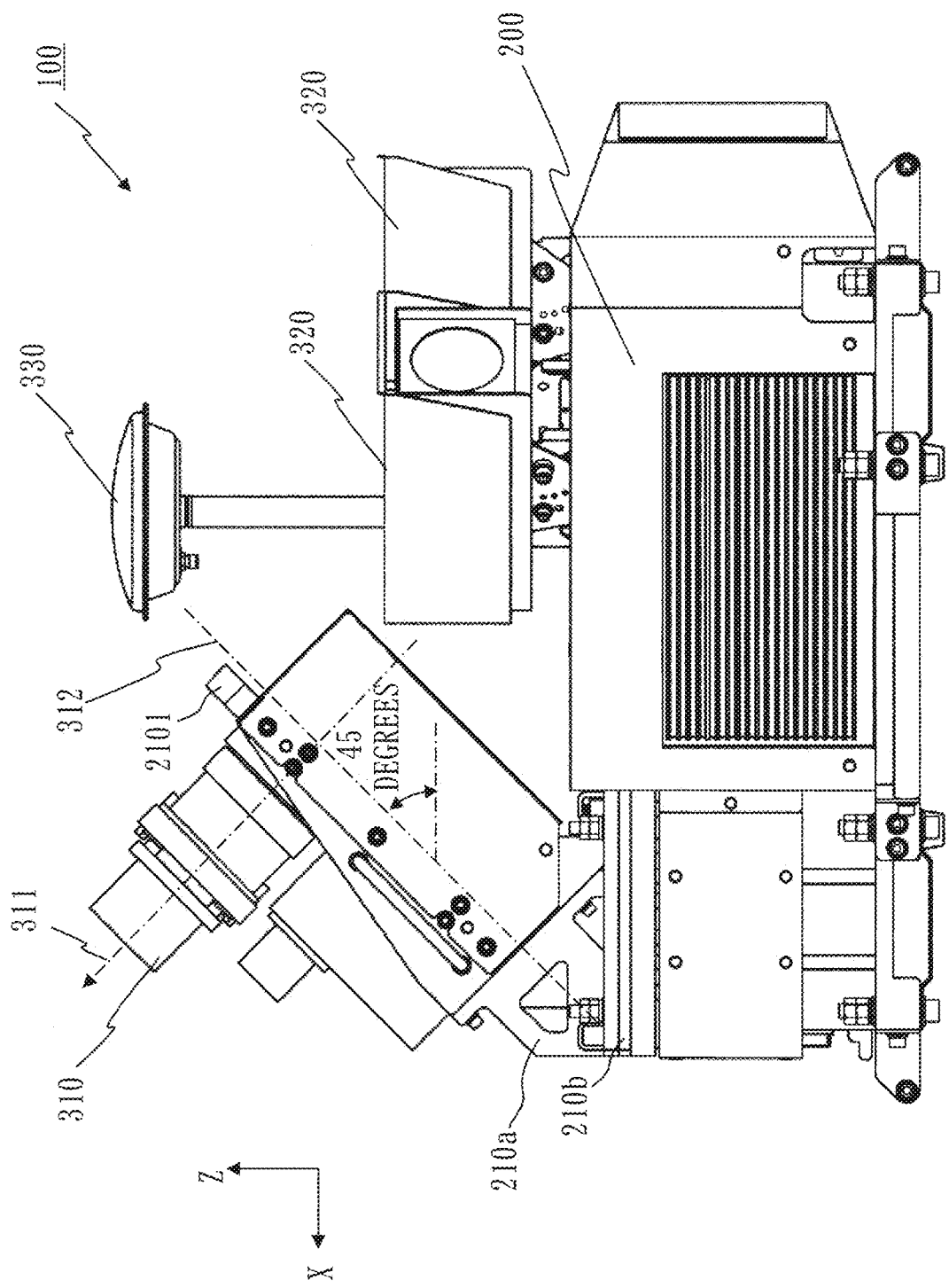
FIG. 3 is a right-side view diagram of the measuring device 100, which is a diagram of the first embodiment.

FIG. 3 is a right-side view diagram of the measuring device 100.

Figure 4:
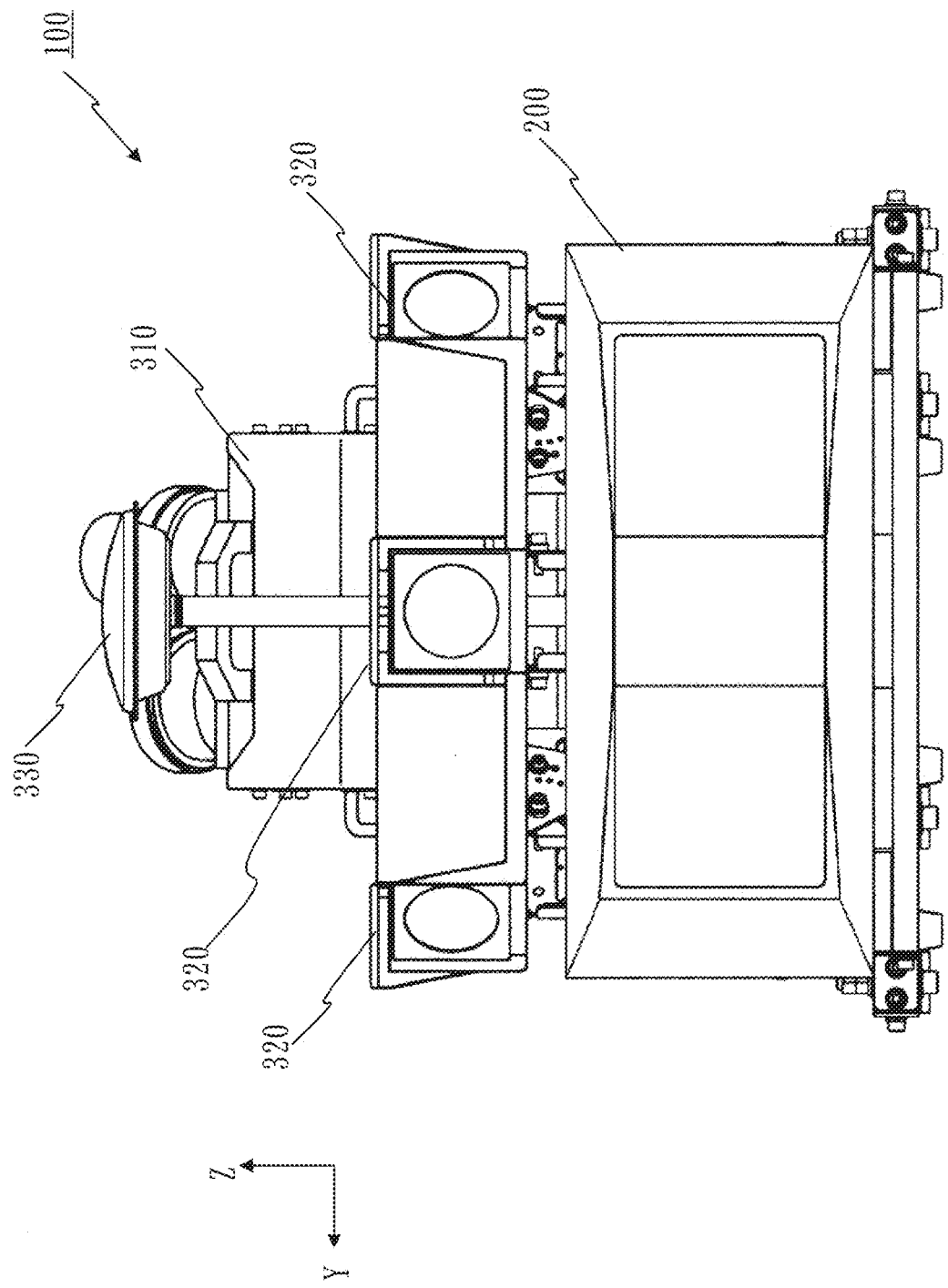
FIG. 4 is a front view diagram of the measuring device 100, which is a diagram of the first embodiment.

FIG. 4 is a front-side view diagram of the measuring device 100.

FIG. 5 is a back-side view diagram of the measuring device 100.

Figure 6:
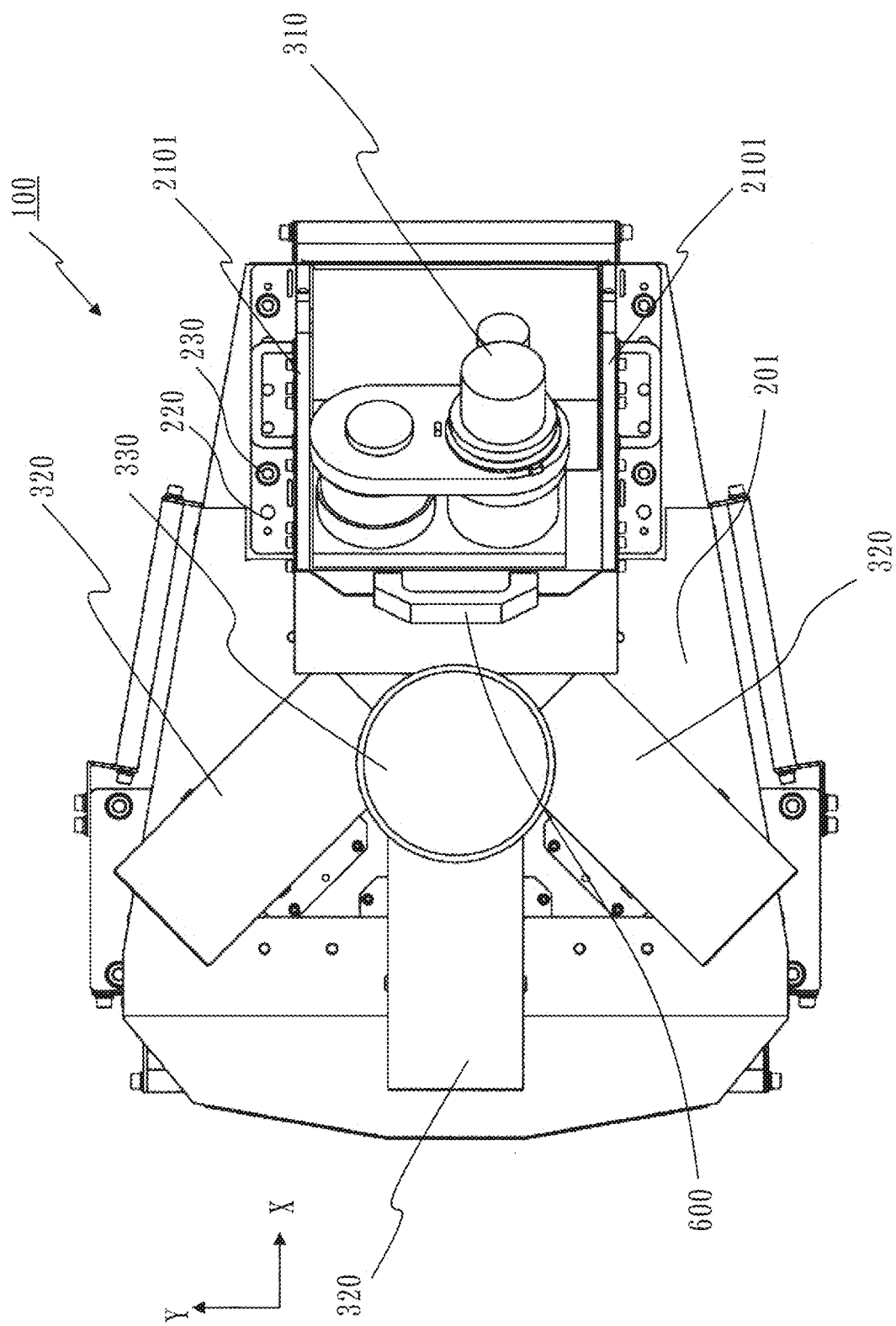
FIG. 6 is a plan view of the measuring device 100, which is a diagram of the first embodiment.

FIG. 6 is a plan view diagram of the measuring device 100.

Figure 7:
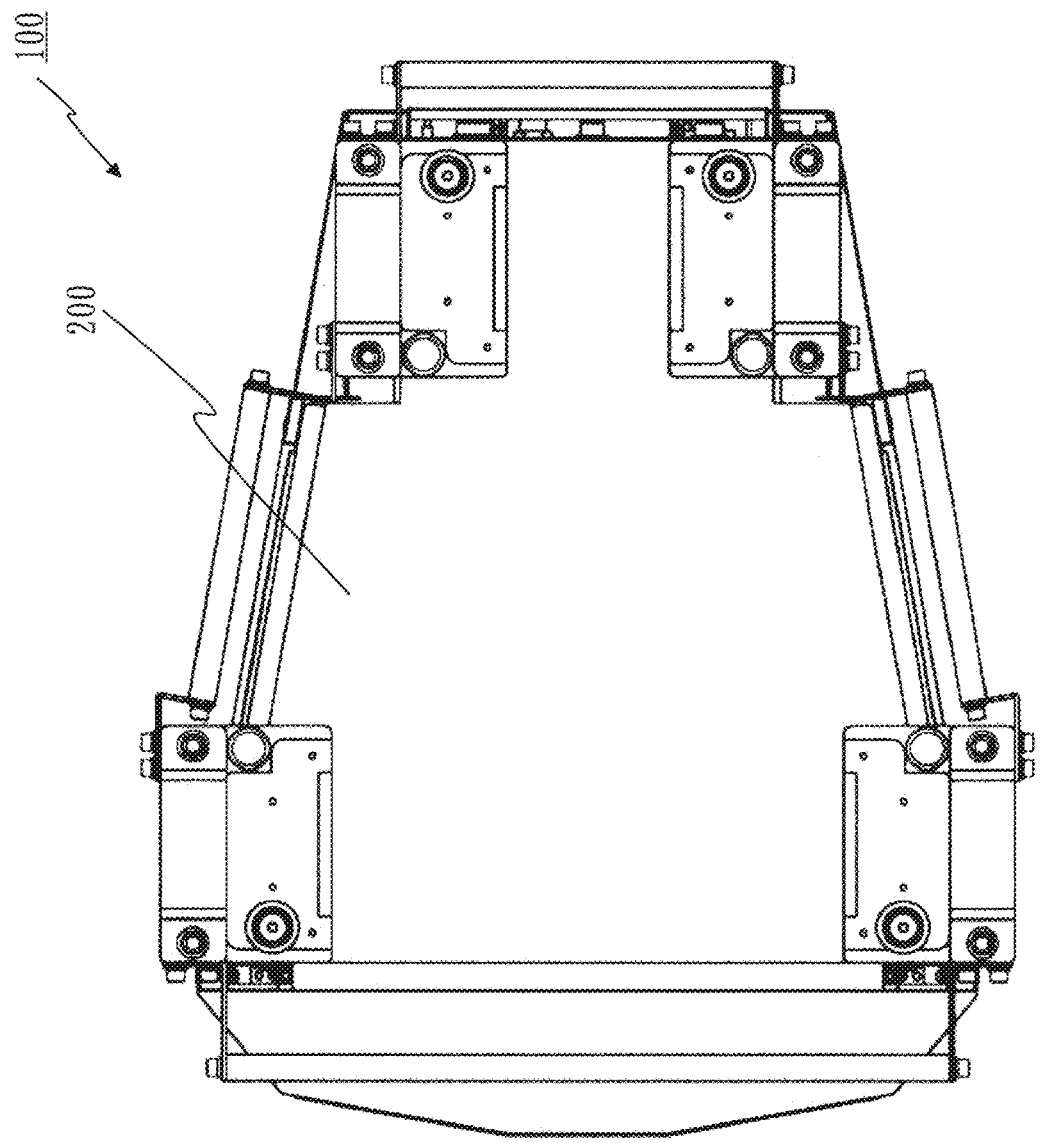
FIG. 7 is a bottom-side view diagram of the measuring device 100, which is a diagram of the first embodiment.

FIG. 7 is a bottom-side view diagram of the measuring device 100.

Figure 8:
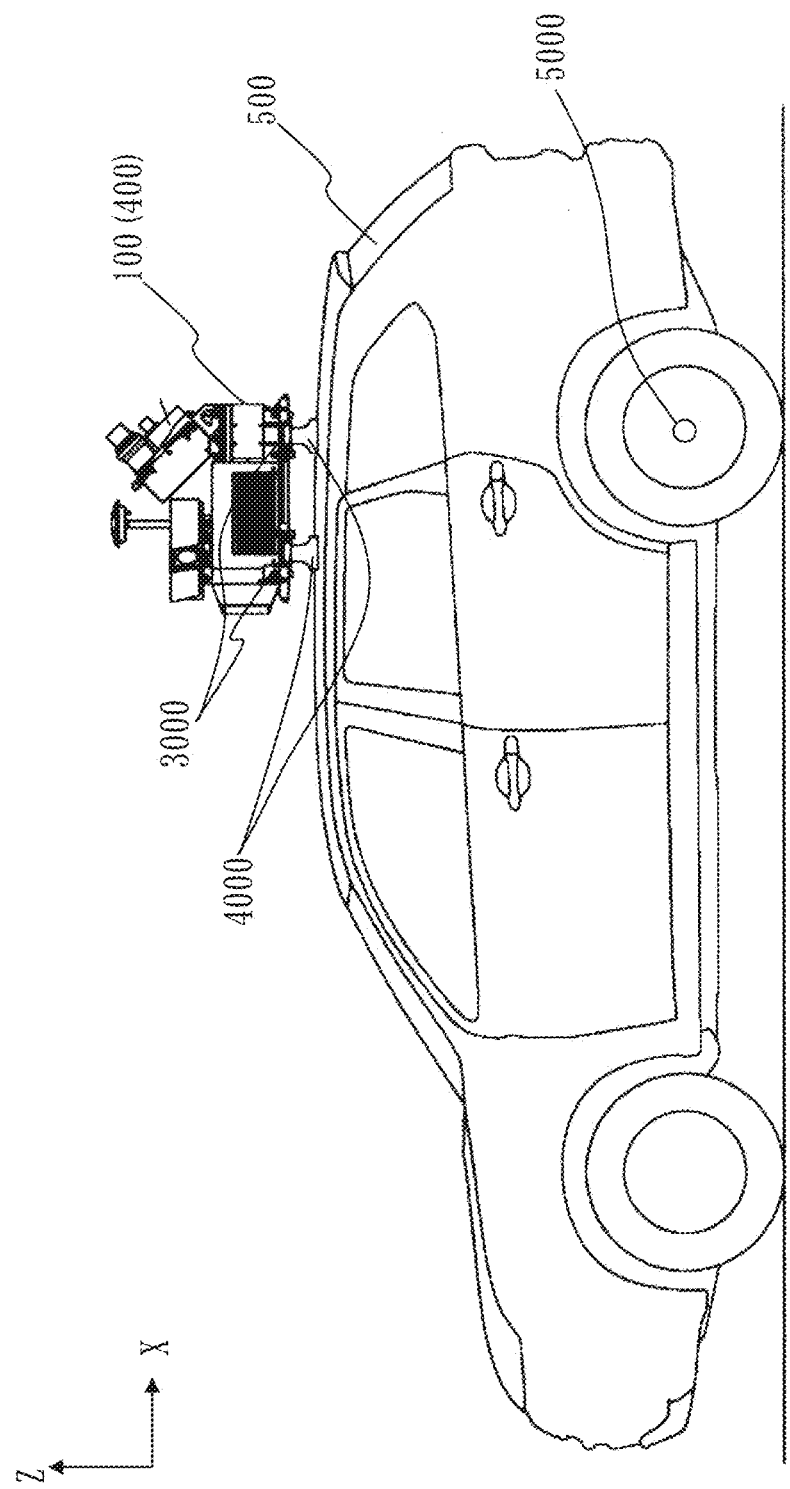
FIG. 8 is a diagram of a state in which the measuring device 100 is arranged on a vehicle 500, which is a diagram of the first embodiment.

FIG. 8 illustrates a state in which the measuring device 100 is arranged on the vehicle 500.

(Housing 200)

As illustrated in FIG. 1, the measuring device 100 includes the housing 200. The housing 200 is a box shape. A specific shape of the housing 200 will be described later in FIG. 11.

(Sensor Part 300)

The laser scanner 310, the image pickup device 320, and a receiving antenna 330 are arranged on and detachably fixed to the top plate 201 of the housing 200. A sensor part 300 is constituted of the laser scanner 310. Further, the sensor part 300 may be constituted of the laser scanner 310 and the image pickup device 320. Further, the sensor part 300 may be constituted of the laser scanner 310, the image pickup device 320, and the receiving antenna 330. The laser scanner 310 and the image pickup device 320 are the optical sensor devices 301. That is, the sensor part 300 includes the optical sensor device 301, but specific examples of the optical sensor device 301 are the laser scanner 310 and/or the image pickup device 320. When it is referred to as the optical sensor device 301, it may be the laser scanner 310, or may also be the image pickup device 320. When it is referred to as the sensor part 300, the sensor part 300 may be the laser scanner 310, include the image pickup device 320, or include the receiving antenna 330. The laser scanner 310 measures a distance to a feature. The image pickup device 320 captures an image of the feature. The receiving antenna 330 receives a positioning signal transmitted by a navigation satellite. Besides, although the inertial device 401 is also a sensor, the inertial device 401 is held and fixed together with the information processing device 403 to the inside of the housing 200, and will be described here by being included in a control part 400 described later.

(Control Part 400)

The housing 200 accommodates the inertial device 401, the receiving device 402, and the information processing device 403.

FIG. 2 illustrates a state of accommodation by the housing 200. The control part 400 includes the inertial device 401, the receiving device 402, and the information processing device 403. The control part 400 is accommodated inside the housing 200. The information processing device 403 is constituted of a CPU, a storage device, and a data communication device. In the information processing device 403, data is transmitted or received via the data communication device, and the transmitted or received data is processed by the CPU, and the processed data is stored in the storage device.

As illustrated in FIG. 5, the back surface of the housing 200 is provided with a wiring board 950 having a LAN wiring purpose terminal 271, a power supply wiring purpose terminal 272, and a sensor connection purpose terminal 273. Further, an aerotonometer connection purpose terminal 274 may be provided.

The LAN wiring purpose terminal 271, the sensor connection purpose terminal 273, and the aerotonometer connection purpose terminal 274 are connected to the data communication device of the information processing device 403. The laser scanner 310 and the image pickup device 320 of the sensor part 300; and the inertial device 401; and the receiving device 402 are connected to the data communication device of the information processing device 403 via the sensor connection purpose terminal 273. The power supply wiring purpose terminal 272 is connected to each of: the laser scanner 310 and the image pickup device 320 of the sensor part 300; the inertial device 401; and the receiving device 402, and supplies power to each sensor.

The LAN wiring purpose terminal 271 is connected to a computer arranged inside the vehicle 500. The power supply wiring purpose terminal 272 is connected to a power supply terminal arranged inside the vehicle 500.

The laser scanner 310, the image pickup device 320, and the receiving antenna 330 are connected to the information processing device 403 via the sensor connection purpose terminal 273.

The inertial device 401, the receiving device 402, and the information processing device 403 are connected to the wiring board 950 by the wires inside the housing 200.

As the inertial device 401, for example, a gyro sensor such as an optical fiber gyro or a MEMS (Micro Electro Mechanical Systems) gyro is used. The inertial device 401 measures acceleration, speed, and angular velocity which act on the housing 200 due to traveling and gravity of the vehicle 500, at a sampling rate of 10 Hz to 100 Hz. The measurement data of the inertial device 401 is input into the information processing device 403.

Further, the information processing device 403 may calculate the speed, a moving direction, a moving distance, and angular velocity of posture change of the vehicle 500 based on the measurement data of the inertial device 401.

An odometer 5000 is attached to a wheel or axle or body of the vehicle 500 and measures the number of rotations of the wheel or axle.

Alternatively, instead of the odometer 5000, a laser or radar speedometer attached to a lower part of the body and measuring the moving speed of the lower part of the body with respect to a road surface may be used.

Besides, the odometer 5000 does not have to be attached.

The data measured by the odometer 5000 is input into the information processing device 403.

The odometer 5000 measures the number of rotations of the wheel of the vehicle 500 and outputs the measurement data. Based on this measurement data, the moving distance of the vehicle 500 by the rotation of the wheels can be measured.

The receiving antenna 330 receives a positioning signal from a GNSS (Global Navigation Satellite System) satellite such as GPS (Global Positioning System), GLONASS, GALILEO, or QZS (Quasi Zenith Satellite).

The receiving device 402 is a GNSS receiver or a GPS receiver that performs a baseband process of the positioning signal received by the receiving antenna 330, converts an analog signal into a digital signal, and reproduces positioning signal data. Further, the receiving device 402 generates position information of the receiving device 402 based on the positioning signal. When generating the position information of the receiving device 402, the receiving device 402 uses positioning reinforcement information obtained by terrestrial data communication such as LTE or WiFi, or by positioning reinforcement signal of QZS, and performs high-precision positioning by a unit from few of centimeters to several tens of centimeters based on RTK positioning.

The information processing device 403 controls operations of the laser scanner 310, the image pickup device 320, the inertial device 401, and the receiving device 402 as well as processes data or information generated by these.

For example, the information processing device 403 associates measurement time information of each sensor with measurement data of the laser scanner 310, measurement data of a captured image of the image pickup device 320, measurement data of the inertial device 401, measurement data of the odometer 5000, and measurement data of positioning signal of the receiving device 402. Then, the information processing device 403 performs a process of storing each measurement data in the storage device. The measurement data that is stored in the storage device of the information processing device 403 and the measurement time information is associated with, is input into an external information processing device (not illustrated) by data communication via the LAN wiring purpose terminal 271.

The external information processing device or the information processing device 403 calculates positions of the receiving antenna 330 and the inertial device 401 and an posture angle of the inertial device 401 by satellite navigation positioning and INS (Inertial Navigation System) combined positioning (GNSS/INS combined positioning) based on the measurement data of the inertial device 401 and the positioning signal data of the receiving device 402, or moving distance data of the odometer 5000, each of which the measurement time information is associated with.

In the combined positioning, a positioning calculation with high-precision may be carried out by tightly coupling observation information of the measurement data of the inertial device 401, observation information of the measurement data of a positioning signal of the receiving device 402, and the positioning reinforcement information by using the Kalman filter.

Further, at this time, it is also acceptable to give absolute position information to luminance information of point cloud data of a laser point group by associating the measurement time information with each piece of data based on the measurement time of the measurement data of the laser scanner 310 and the measurement time of the combined positioning.

Further, it is acceptable to add color information to the luminance information by associating the measurement time information with the point cloud data of the laser point group based on the measurement time of the captured image of the image pickup device 320.

Besides, by integrally accommodating the information processing device 403, the inertial device 401, and the receiving device 402 in the housing 200, it is possible to reduce the number of connection wires and signal paths to the inside of a vehicle room of the vehicle 500, and thus it is possible to reduce the diameter of the connection wires to the inside of the vehicle room.

Further, by providing an outer back surface of the housing 200 with the wiring board 950 having various terminals, it is possible to easily connect an aerotonometer and a computer to the housing 200, and control of the sensor part 300 becomes easy.

Further, the information processing device 403 may operate the laser scanner 310 and the image pickup device 320 in corporate with each other.

In this case, the laser scanner 310 and the image pickup device 320 may be in corporate with each other by inputting an external signal for which the corporation operation is turned on, by the operation input part (mouse or pointing device) of the computer.

On the other hand, by providing the control part 400 with the information processing device 403, the weight becomes heavy. Then, in the measuring device 100 of the first embodiment, the optical sensor device 301 can be detachable from the housing 200.

Figure 9:
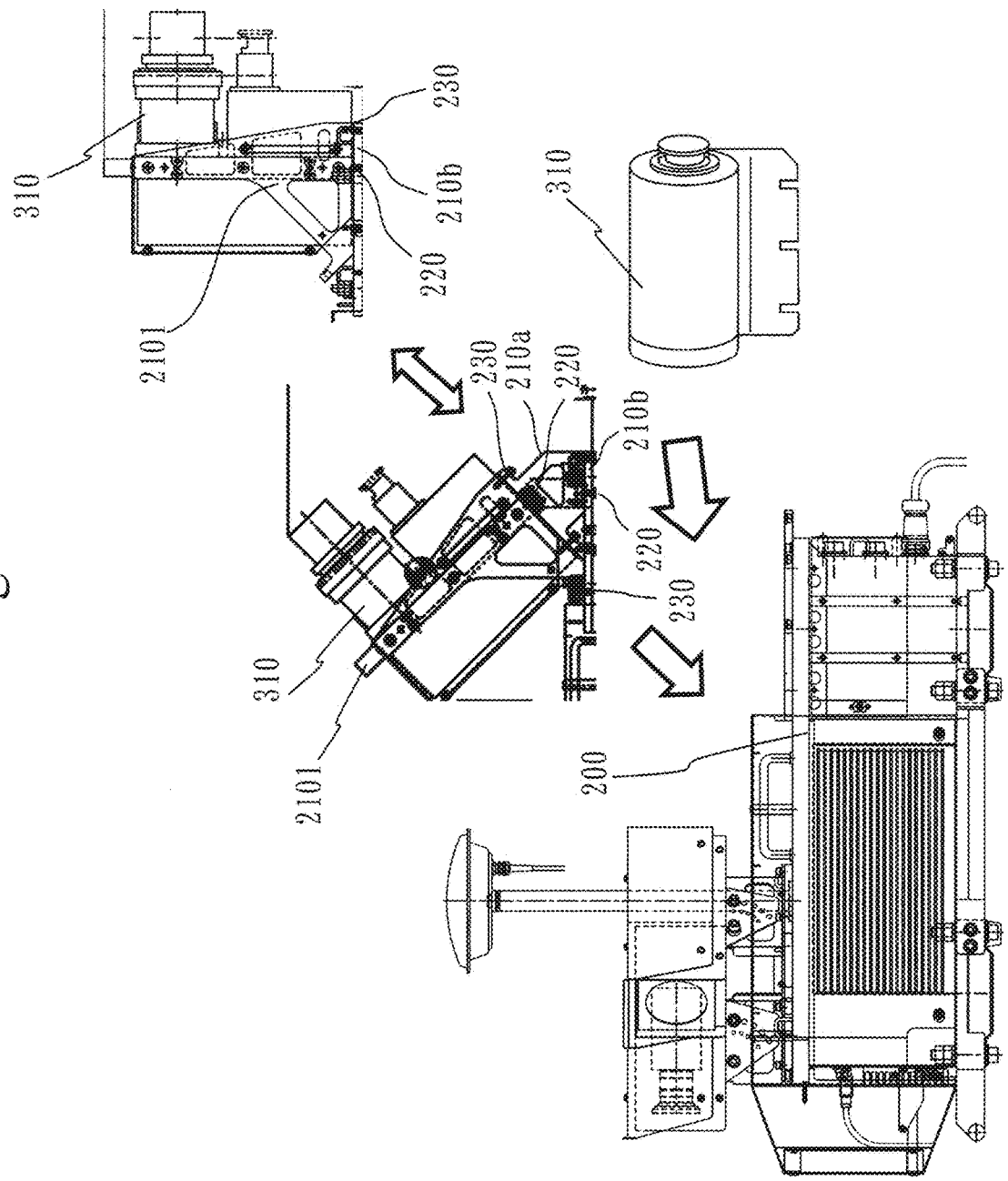
FIG. 9 is a diagram illustrating that an optical sensor device 301 can be attached to and detached from a housing 200, which is a diagram of the first embodiment.

FIG. 9 illustrates that the optical sensor device 301 is detachable from the housing 200.

A case of attaching and detaching the optical sensor device 301 means following cases (1) and (2).

Here, it is assumed that the optical sensor device 301 is at least the laser scanner 310. Further, at least the inertial device 401 is attached and fixed to the housing 200.

(1) This is a case in which the optical sensor device 301 is attached to the housing 200 to which the optical sensor device 301 has not been attached.

(2) This is a case in which the optical sensor device 301 is detached from the housing 200 to which the optical sensor device 301 has been attached. When the optical sensor device 301 is attached to the housing 200 to which the inertial device 401 (control part 400) has been fixed, the optical sensor device 301 is required to have attachment reproducibility in the attachment position at the housing 200 and the posture at the housing 200.

The posture is a roll angle, a pitch angle, and a yaw angle with respect to the housing 200 of the optical sensor device 301. That is, the attachment reproducibility means that even if the optical sensor device 301 is repeatedly detached from the housing 200 and attached to the housing 200, the optical sensor device 301 is always fixed to the housing 200 in the same position and the same posture with respect to the housing 200.

In the measuring device 100 of the first embodiment, it is possible to attach and detach the optical sensor device 301 to and from the housing 200. Also, the measuring device 100 of the first embodiment is characterized by the optical sensor device 301 having the attachment reproducibility by fixing the optical sensor device 301 to the housing 200 using at least two pins 220 for deciding the position, and using a plurality of screws 230 as fastening members. Besides, as long as it is a component that fastens the optical sensor device 301 to the housing 200, a component other than the screw 230 may be used.

As illustrated in FIG. 9, when the detachable optical sensor device 301 is separated from the housing 200, it is effective to separate the heaviest optical sensor device 301. Since the control part 400 is accommodated in the housing 200, separating the optical sensor device 301 from the housing 200 means separating the optical sensor device 301 from the control part 400. Since the laser scanner 310 is generally heavier than the image pickup device 320, it is effective to separate the laser scanner 310 from the housing 200. Hereinafter, the laser scanner 310 will be described by being assumed as the optical sensor device 301.

The descriptions of the laser scanner 310 also apply to the image pickup device 320. That is, the image pickup device 320 can be attached to and detached from the housing 200, and the image pickup device 320 may be fixed to the housing 200 using the pins 220 and the screws 230 so that the image pickup device 320 has the attachment reproducibility.

It is sufficient if the receiving antenna 330 is fixed to the housing 200 with an accuracy by 1 cm or less, and the receiving antenna 330 may be fixed only with screws.

As illustrated in FIG. 9, when the laser scanner 310 detached from the housing 200 is reattached to the housing 200, as described later, three types of fixing members 210 (2101, 210*a*, and 210*b*) can be used to change the attachment angle with respect to the housing 200, that is, the posture with respect to the housing 200. As illustrated in FIG. 1, the fixing member 210 is constituted of the fixing member 2101, the fixing member 210*a*, and the fixing member 210*b*.

Figure 10:
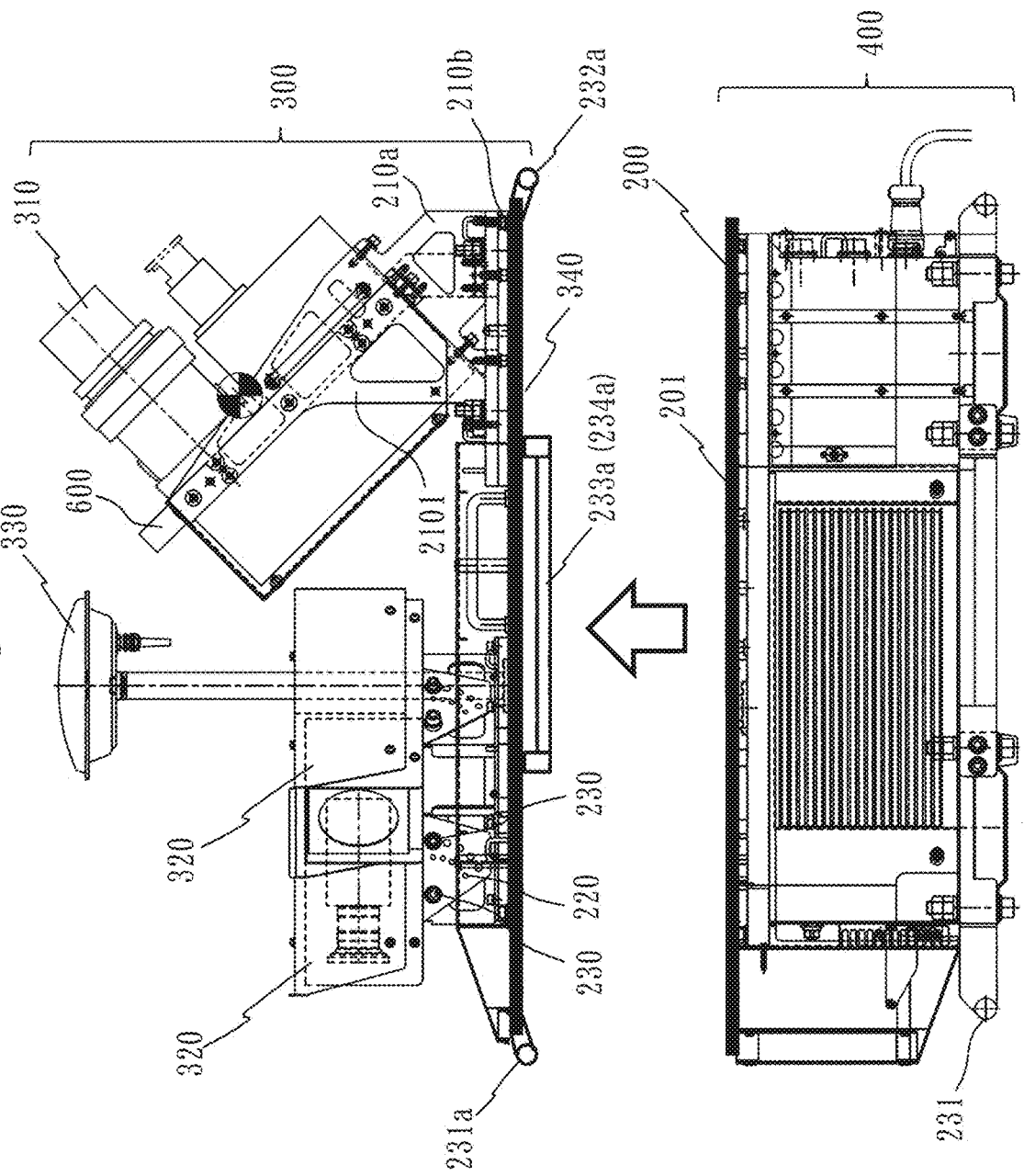
FIG. 10 is a diagram illustrating separation of a sensor part 300 and a control part 400 from each other, which is a diagram of the first embodiment.

In a case of FIG. 9, the sensor part 300 includes the heaviest laser scanner 310. By separating this laser scanner 310 from the control part 400, it is possible to improve the mounting capability. On the other hand, FIG. 10 illustrates another aspect in which the sensor part 300 and the control part 400 are separated from each other. That is, in FIG. 10, the sensor part 300 and the housing 200 can be detachably fixed.

In FIGS. 9 and 10, by including the image pickup device 320 in the sensor part 300 and separating the image pickup device 320 from the control part 400, it is possible to further reduce a mounting weight when the control part 400 is mounted on a loading platform of the vehicle 500.

Further, since the image pickup device 320 can be separated from the sensor part 300, each one may be separately mounted on the control part 400.

In addition, in a case of FIG. 10, since the sensor part 300 and the control part 400 are separated from each other, it is possible to improve the mounting capability in the same manner as the case of FIG. 9.

Here, a configuration of another aspect illustrated in FIG. 10 is as follows.

The sensor part 300 is separably fixed to a base part 340 which is a base.

The base part 340 to which the sensor part 300 is fixed is fixed to the top plate 201 of the housing 200.

In an example of FIG. 10, the base part 340 has handles 231*a* to 234*a*. The handles 231*a* to 234*a* do not have to be provided on the base part 340 as illustrated in FIGS. 1 to 10 and FIGS. 12 to 21. That is, instead of the handles 231*a* to 234*a* that the base part 340 has, handles 231 to 234 may be provided on the housing 200 as described later in FIG. 11.

The base part 340 is made easier to hold by the handles.

The mounting capability of the measuring device 100 is improved by a configuration of FIG. 10.

At this time, it is possible to lift up the control part 400 by at least two people by using two front and back handles: the handle 231*a* and a handle 232*a*, or two left and right handles: a handle 233*a* and the handle 234*a*, or all of those four handles.

In addition, since the laser scanner 310 of the sensor part 300 is installed with the handles 600, the laser scanner 310 has good mounting capability.

Further, each of at least two places of a carrier 4000 of the vehicle 500 is equipped with one of two fixing parts 3000 (FIG. 8).

The control part 400 is fixed to this fixing part 3000.

The fixing part 3000 has a cuboid-shaped protrusion part at an upper part.

Alternatively, the fixing part 3000 may be a rectangular-bar-shaped object crossing over the left and right carrier bars.

At this time, four holding parts 7000 (FIG. 2) are provided around four corners of a bottom surface of the control part 400. A groove 8000 is formed on a lower surface of the holding part.

The groove 8000 forms a cuboid-shaped space area.

When the control part 400 is mounted, the groove 8000 of the holding part 7000 is fitted into the protrusion part or the upper part of the fixing part 4000.

As a result, the control part 400 can be easily mounted on the vehicle 500.

Further, since calibration is decided only by the sensor part 300, it is possible to decide calibration parameter at a factory by bringing to the factory, the sensor part 300 separated from the control part 400.

Figure 11:
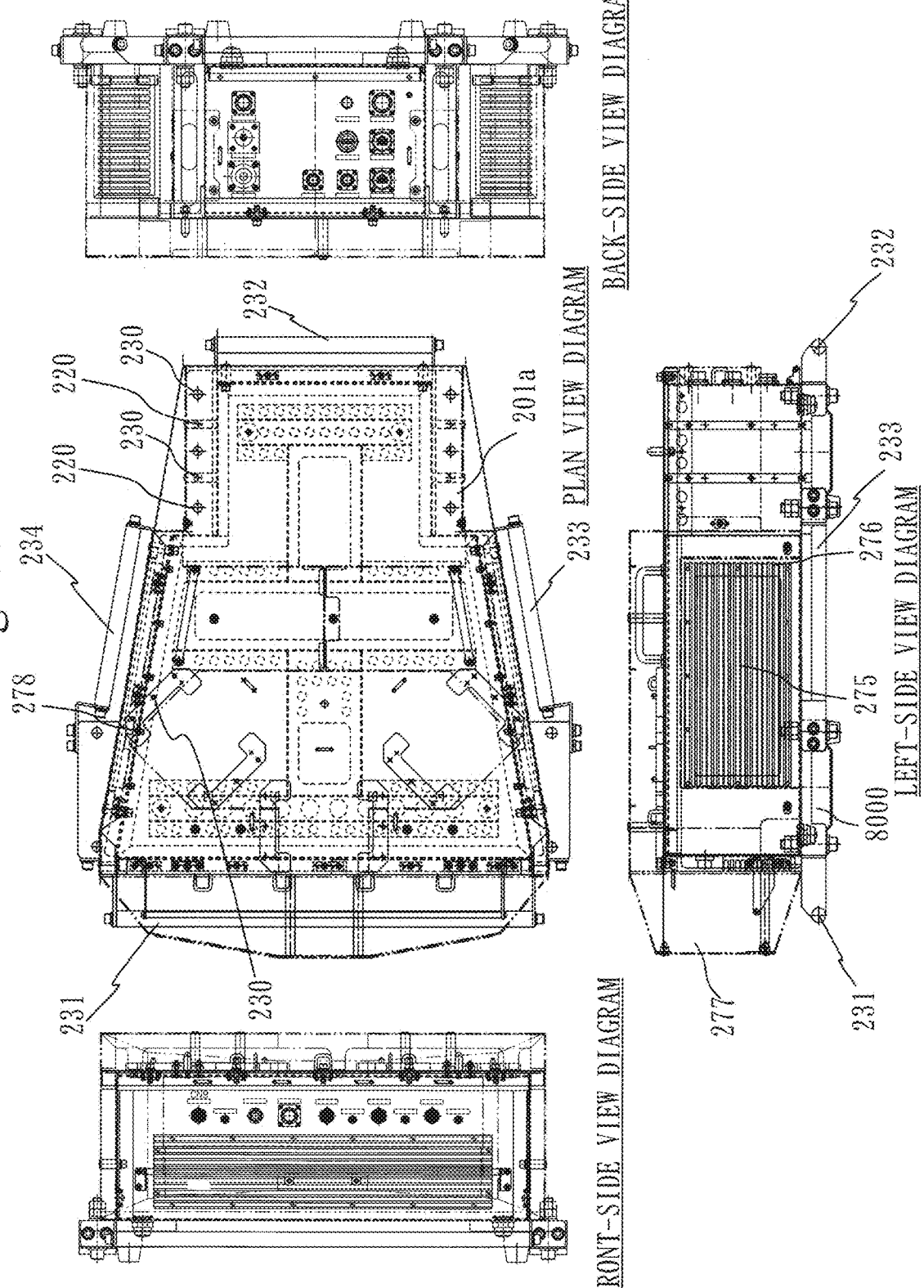
FIG. 11 is a four-views diagram of the housing 200, which is a diagram of the first embodiment.

FIG. 11 illustrates a four-views diagram of the housing 200. The upper left, center, and right are a front-side view, a plan view, and a back-side view, respectively. Below is a left-side view. The housing 200 has the handles 231, 232, 233, and 234 on the front side, back side, left side, and right side, respectively. Since the housing 200 has four handles, the mounting capability when the housing 200 is mounted on the vehicle 500, is improved.

For example, it is possible to lift up the control part 400 by at least two people by using the two front and back handles: the handle 231 and the handle 232, or the two left and right handles: the handle 233 and the handle 234, or all of those four handles.

In addition, since the laser scanner 310 of the sensor part 300 is installed with the handles 600, the laser scanner 310 has good mounting capability.

Further, the housing 200 is provided with heat radiating fins 275 and ventilation holes 276 on both side surfaces, which are on the left and right-side surfaces, of the vehicle 500.

Further, the top plate 201 and the front part of the housing 200 are covered with an awning cover 277.

The heat radiating fins 275 and the ventilation holes 276 dissipate to the outside, the heat generated inside the housing 200, and the awning cover 277 shields incoming solar heat from the outside of the housing 200.

Besides, the plan view diagram of FIG. 11 illustrates a camera attachment pedestal 278 and the laser attachment pedestal 201a.

Figure 12:
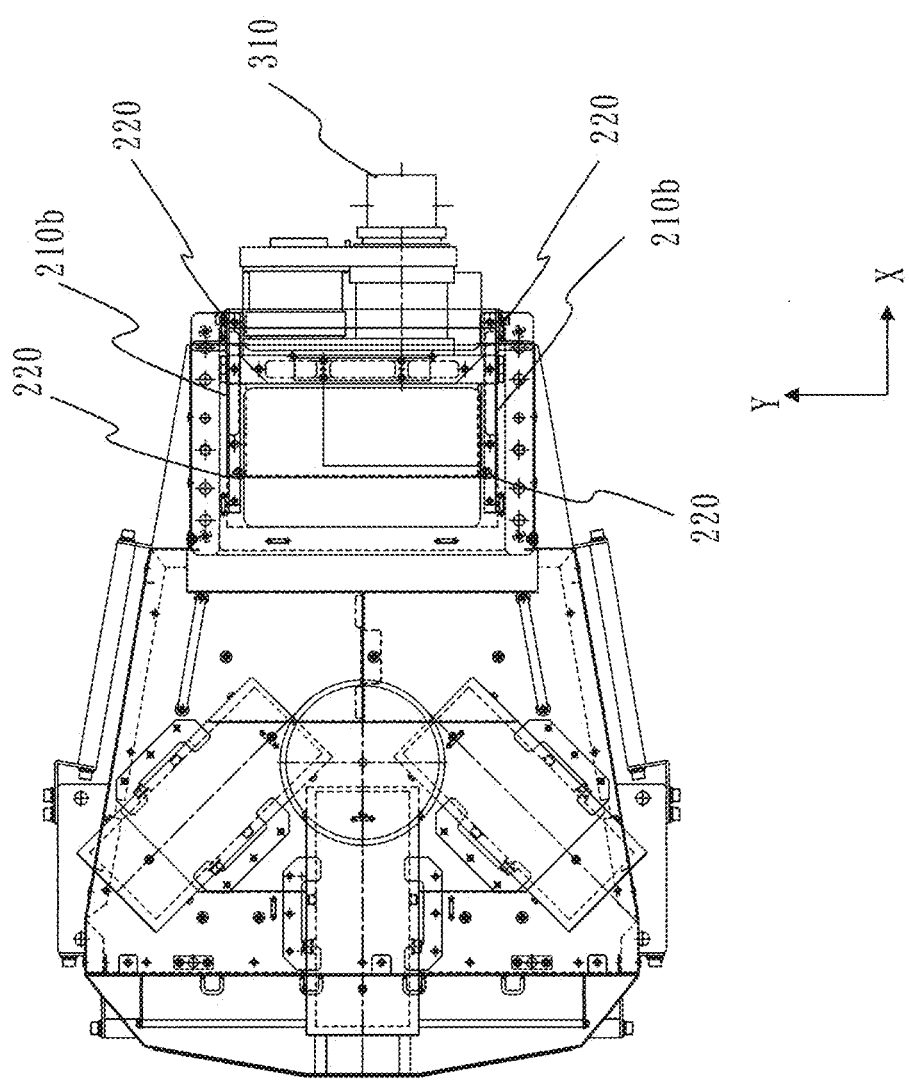
FIG. 12 is a plan view diagram of the measuring device 100, which is a diagram of the first embodiment.
Figure 13:
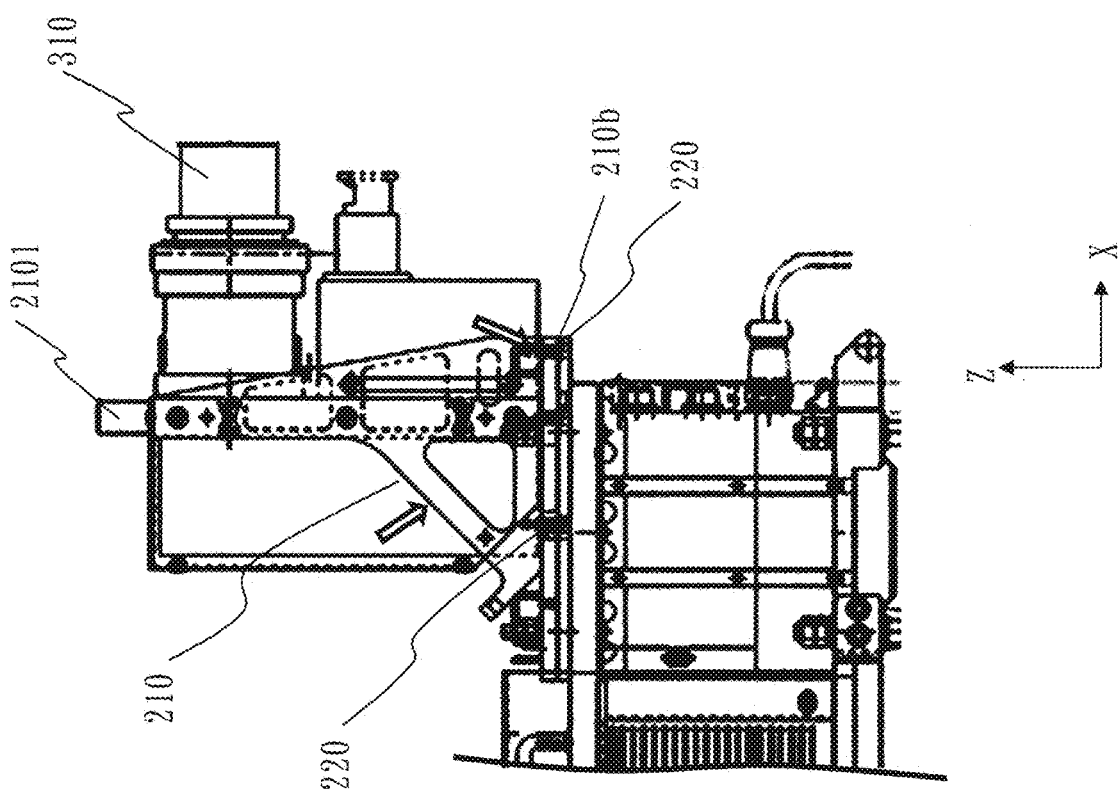
FIG. 13 is a left-side view diagram of the measuring device 100, which is a diagram of the first embodiment.

FIGS. 12 and 13 illustrate a configuration for achieving improvement of the mounting capability. FIGS. 12 and 13 illustrate a case of 90 degrees.

FIG. 12 is a plan view diagram of the measuring device 100.

FIG. 13 is a part of the left-side view diagram of the measuring device 100. FIG. 13 is an arrow view in a Y direction of FIG. 12. Here, 45 degrees and 90 degrees, which mean angles of the laser scanner 310, will be described. It has been stated that FIGS. 1 to 8 illustrate the measuring device 100 at 45 degrees, but 45 degrees have the following meanings. In FIG. 3, the arrow 311 illustrated on the laser scanner 310 is referred to as a laser axis. Laser light is emitted radially centering on the arrow 311 as the central axis. 45 degrees mean that an angle formed by a line segment 312 orthogonal to the arrow 311 which is the laser axis in FIG. 3, and by an X axis is 45 degrees.

The meanings of 60 degrees and 90 degrees are the same as 45 degrees.

Figure 14:
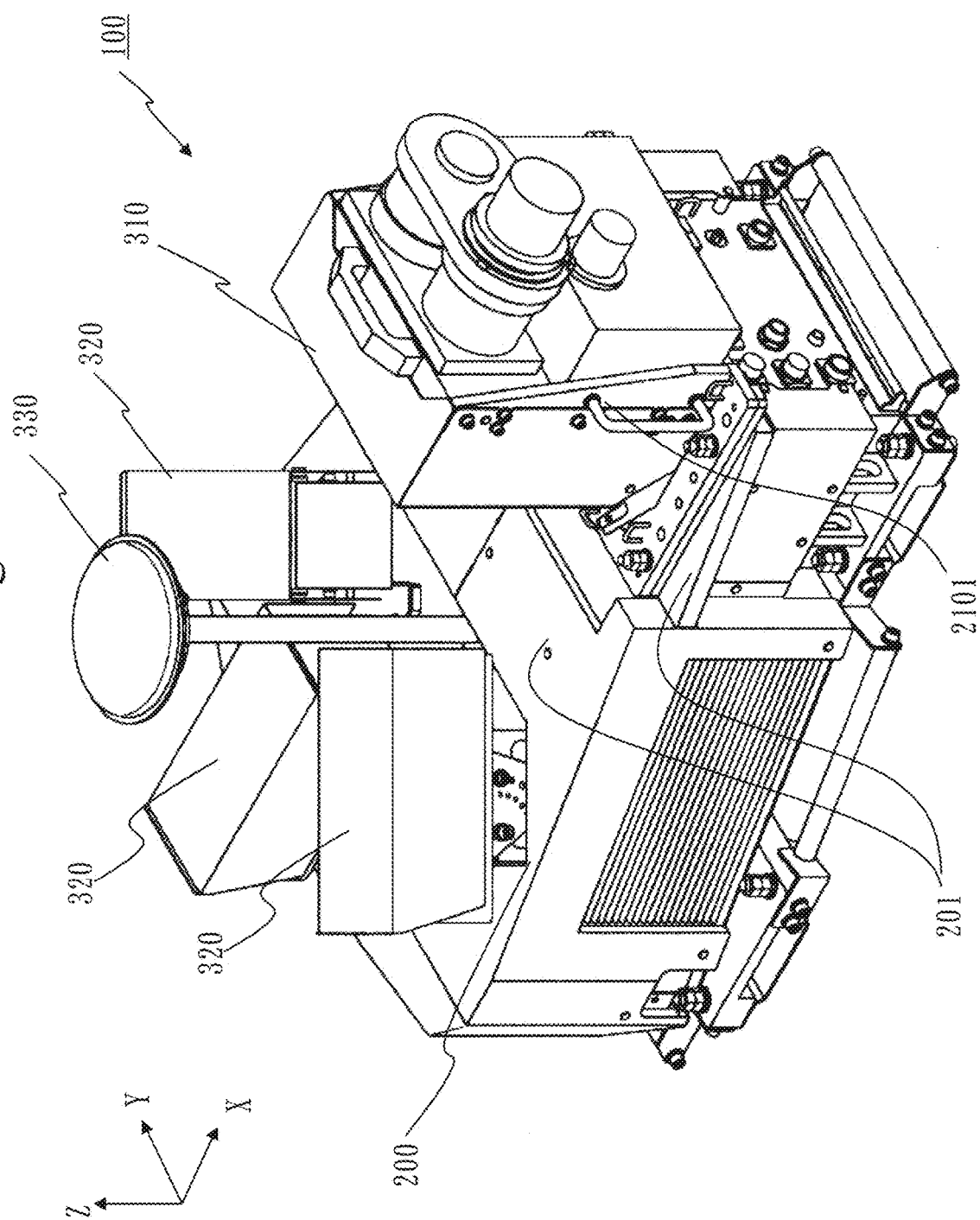
FIG. 14 is a perspective view diagram of the measuring device 100 at 90 degrees, which is a diagram of the first embodiment.

FIG. 14 is a perspective view diagram of the measuring device 100 on which the laser scanner 310 is at 90 degrees.

Figure 15:
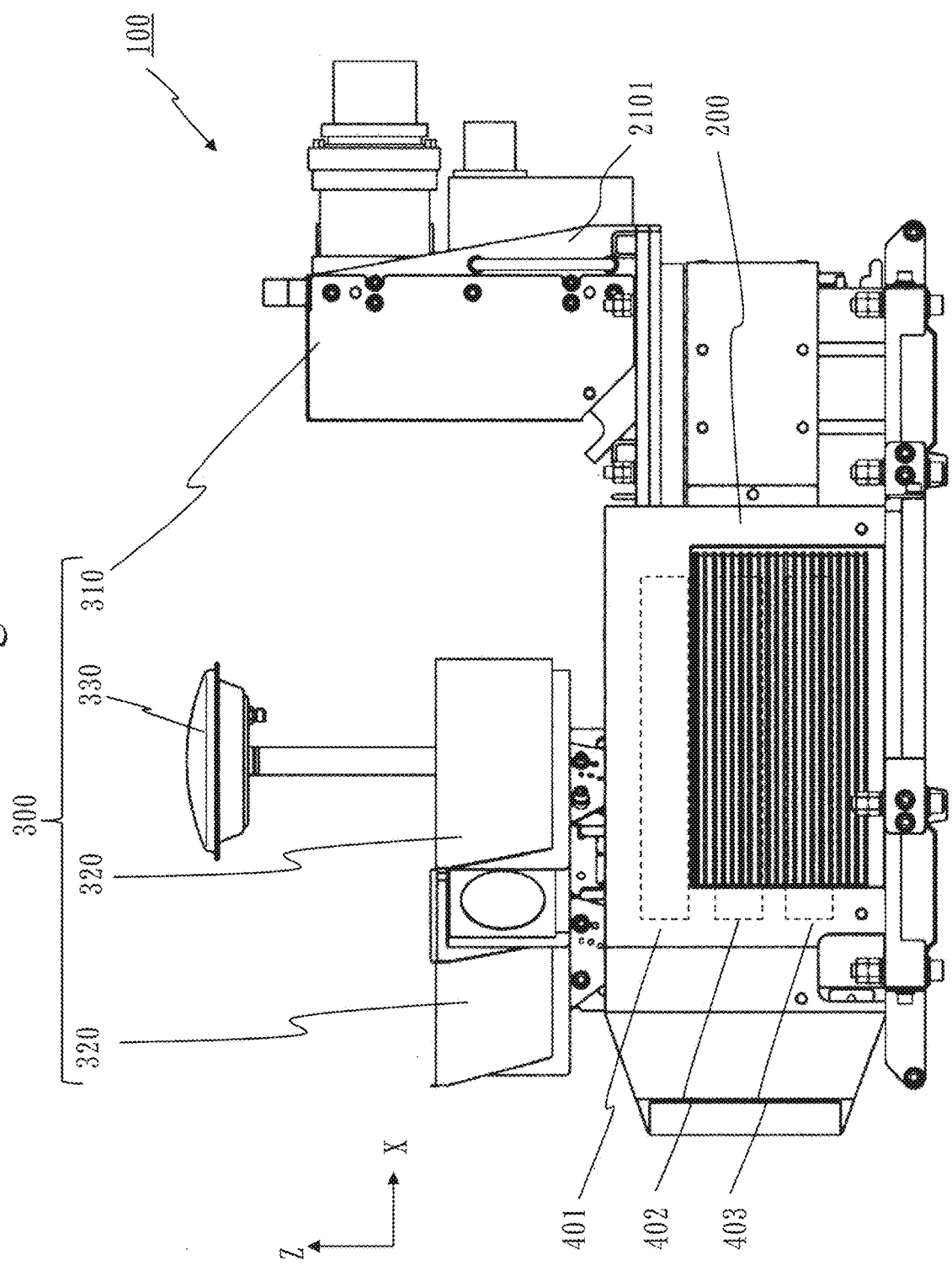
FIG. 15 is a left-side view diagram of the measuring device 100 at 90 degrees, which is a diagram of the first embodiment.

FIG. 15 is a left-side view diagram of the measuring device 100 on which the laser scanner 310 is at 90 degrees.

Figure 16:
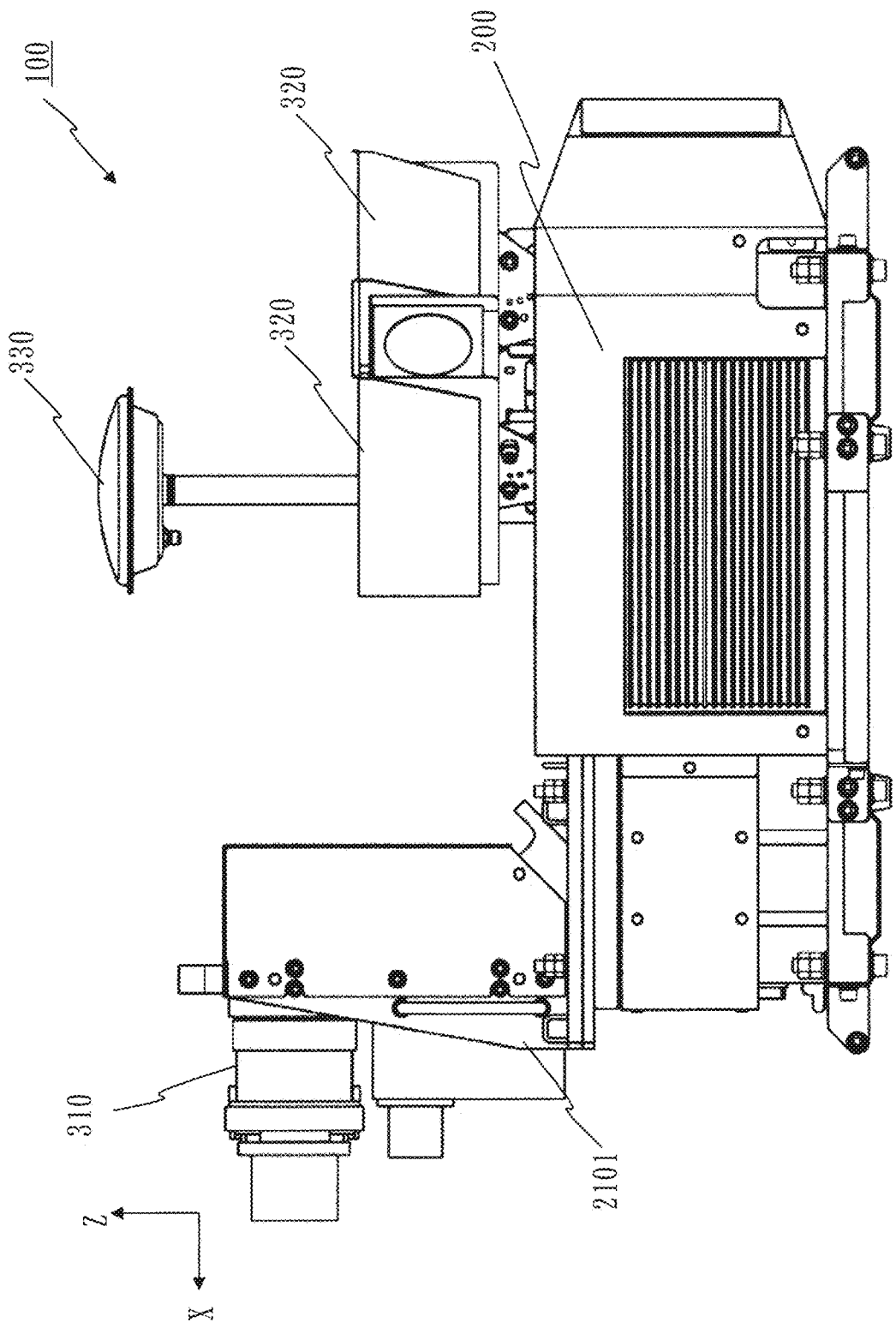
FIG. 16 is a right-side view of the measuring device 100 at 90 degrees, which is a diagram of the first embodiment.

FIG. 16 is a right-side view diagram of the measuring device 100 on which the laser scanner 310 is at 90 degrees.

Figure 17:
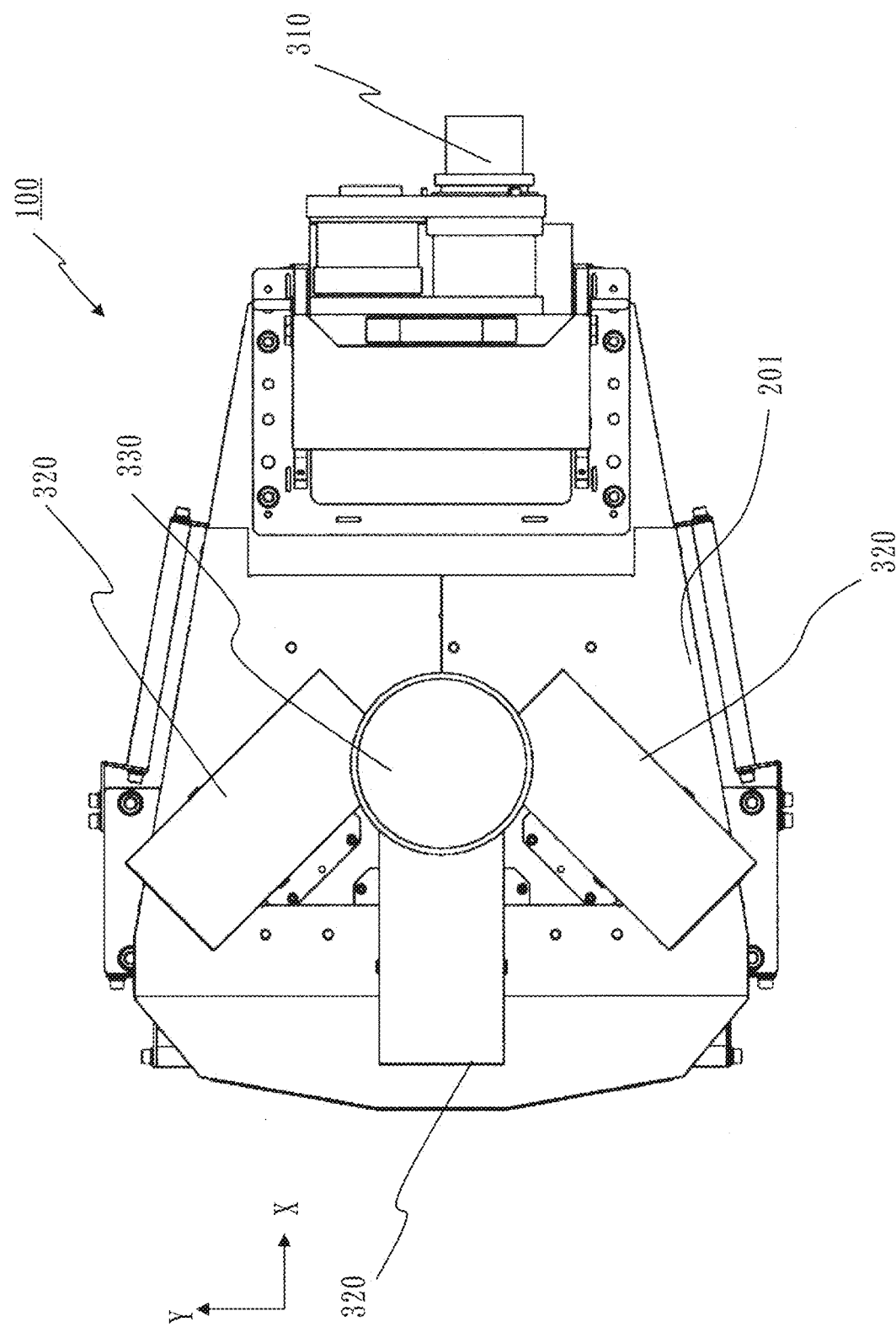
FIG. 17 is a plan view diagram of the measuring device 100 at 90 degrees, which is a diagram of the first embodiment.

FIG. 17 is a plan view diagram of the measuring device 100 on which the laser scanner 310 is at 90 degrees.

When only the laser scanner 310 is detached from the measuring device 110, the laser scanner 310 is attached to the housing 200 by using a rigid fixing member 210 and bar-shaped pins 220 in order to improve the attachment reproducibility of the laser scanner 310. In FIG. 12, the laser scanner 310 is fixed to the housing 200 by using two fixing members 210. Each fixing member 210 is positioned on the top plate 201 of the housing 200 by two pins 220. The pins 220 may be press-fitted and fixed in advance to either the fixing members 210 or the housing 200.

Figure 18:
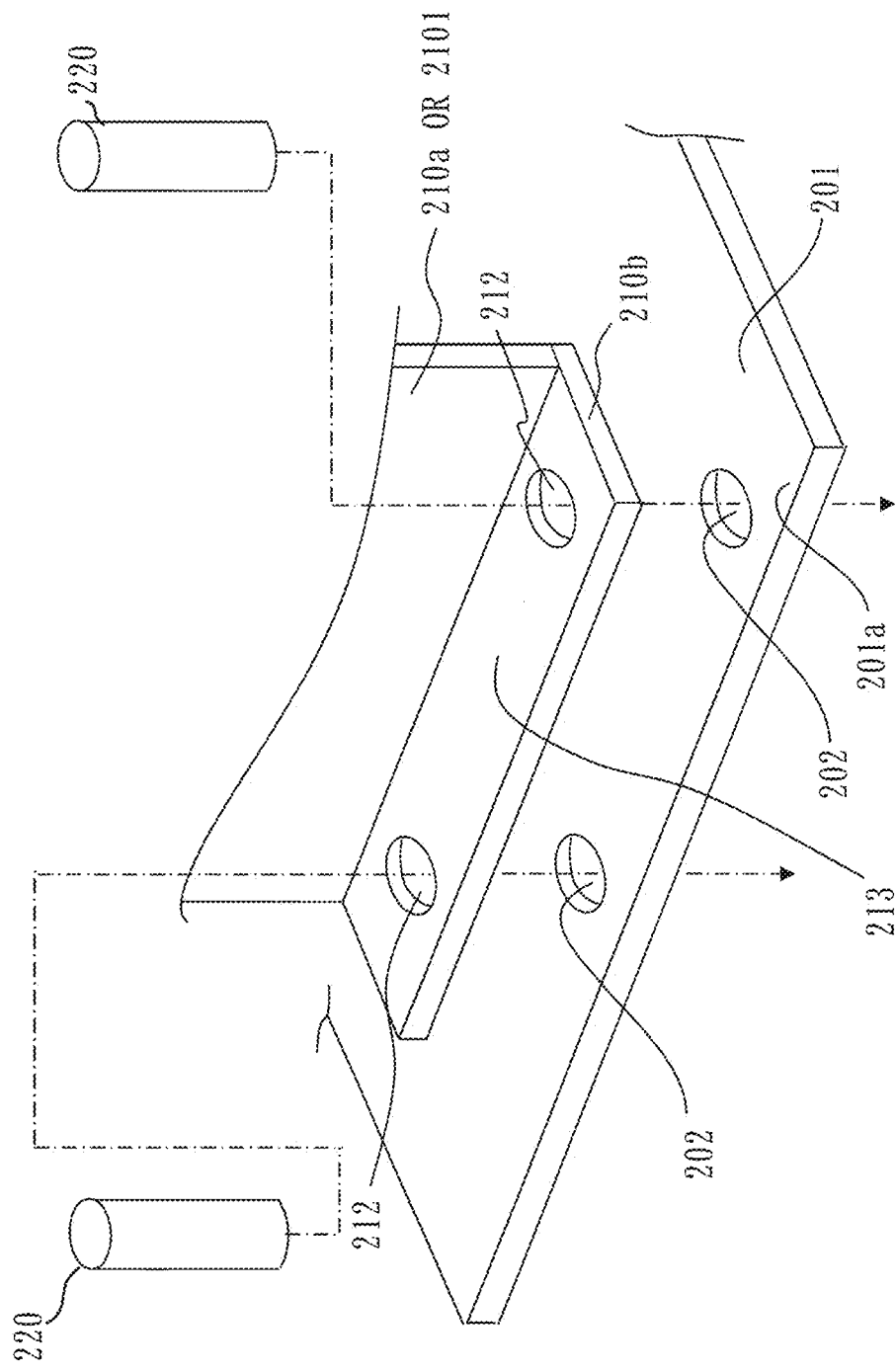
FIG. 18 is a diagram explaining a method of deciding a position of a laser scanner 310 using pins 220, which is a diagram of the first embodiment.

FIG. 18 describes a method of deciding the position of the laser scanner 310 using the pins 220. The laser scanner 310 is fixed to the fixing member 210, but the position of the laser scanner 310 is decided on the housing 200 by deciding the position of the fixing member 210 on the housing 200. The fixing member 210 (210b) has a protruding part 213 protruding from the lower part. Two through holes 212 are formed on the protruding part 213. Further, on the top plate 201, through holes 202 corresponding to each of the two through holes 212 are formed. A position of the fixing member 210 on the housing 200 is decided by the two pins 220 fitting into each of the through holes 212 and the through holes 202. Besides, although the pins 220 are single components in FIG. 18, the pin 220 is not limited to this and may be a configuration in which a bar-shaped body in a shape of the pin 220 protrudes from the top plate 201. Besides, the fixing member 210 decides the posture of the laser scanner 310 with respect to the housing 200.

Further, when the housing 200 and the laser scanner 310 are positioned via the pins 220 by using the screws 230 around the pins 220, the screws 230 are attached and detached.

Figure 19:
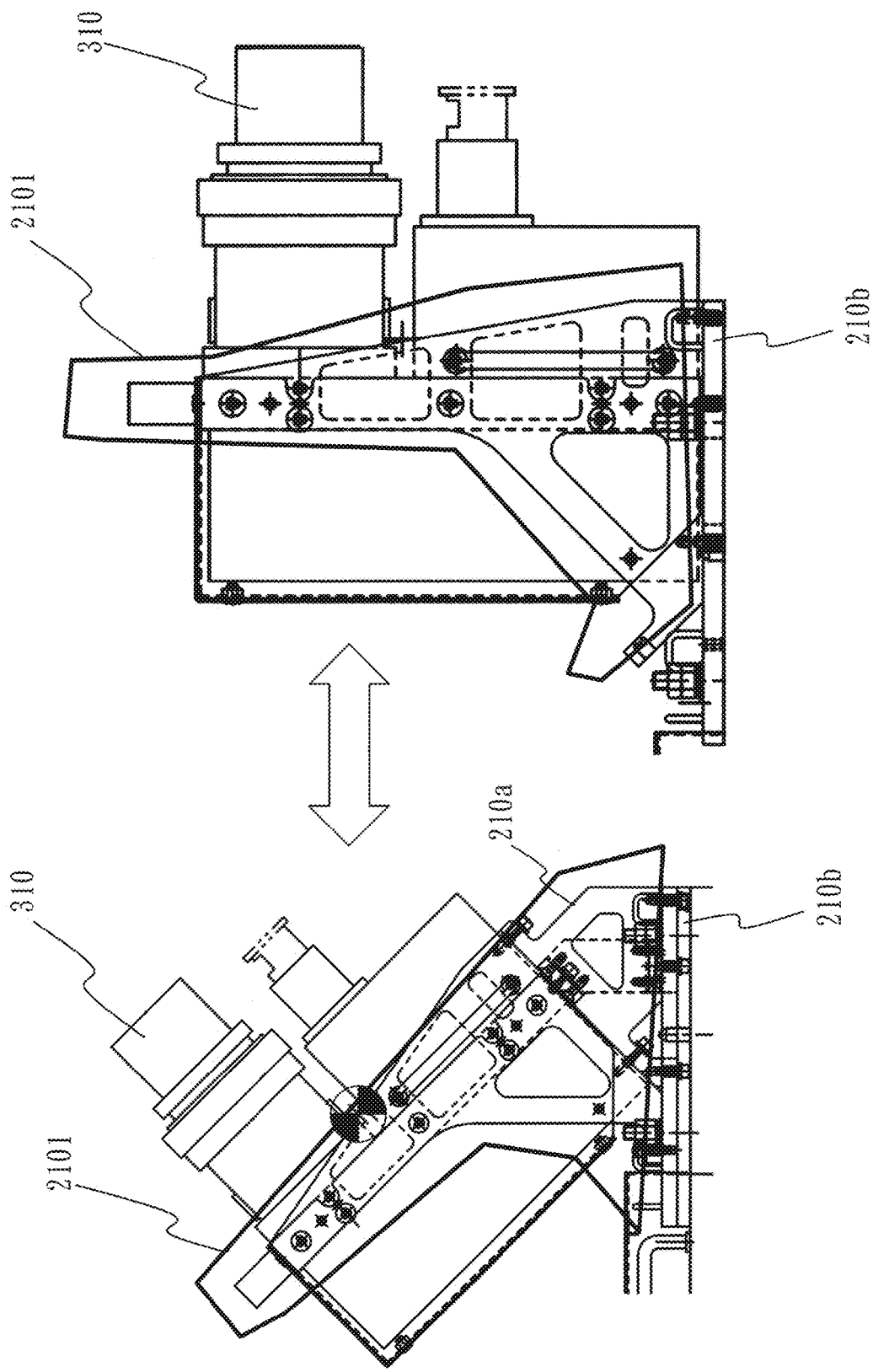
FIG. 19 is a diagram illustrating attachment of the laser scanner 310 using two types of fixing members which are a fixing member 210a and a fixing member 210b at 90 degrees, which is a diagram of the first embodiment.

FIG. 19 illustrates attachment of the laser scanner 310 using two types of fixing members 210: the fixing member 210a at 45 degrees; and the fixing member 210b at 90 degrees.

Figure 20:
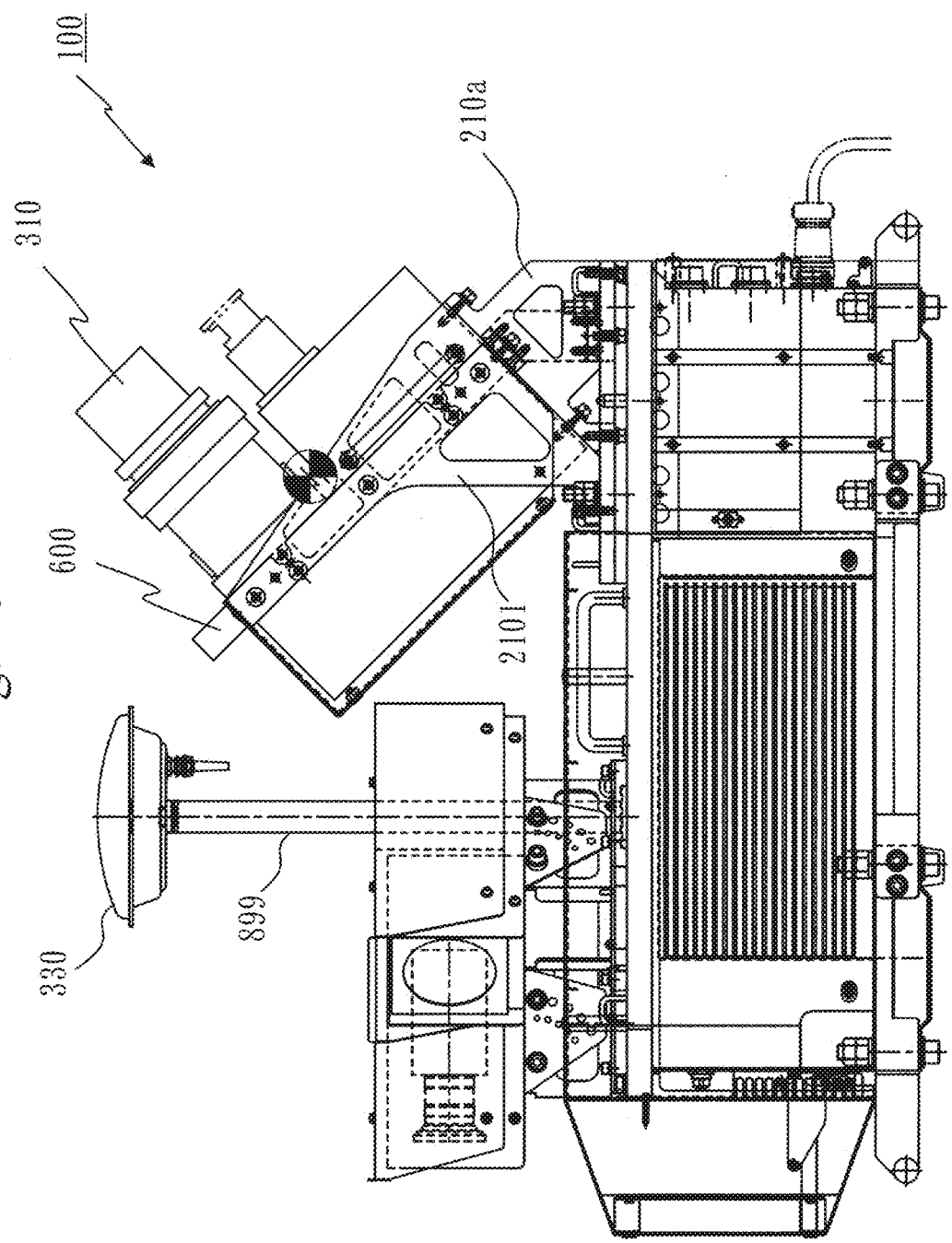
FIG. 20 is a left-side view diagram of the measuring device 100 when the fixing member 210a is used, which is a diagram of the first embodiment.

FIG. 20 is a left-side view diagram of the measuring device 100 when the fixing member 210a is used.

Figure 21:
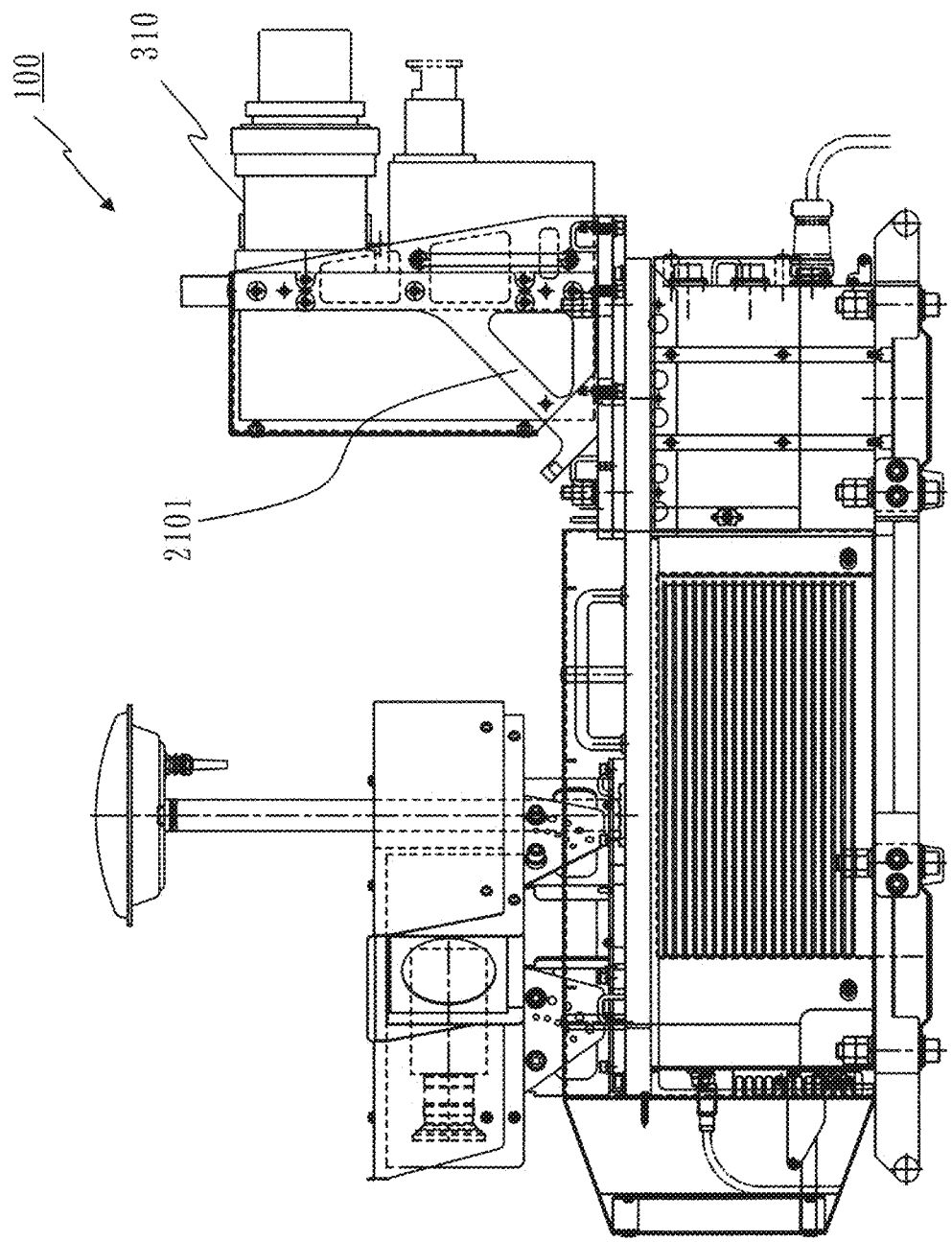
FIG. 21 is a left-side view diagram of the measuring device 100 when the fixing member 210b is used, which is a diagram of the first embodiment.

FIG. 21 is a left-side view diagram of the measuring device 100 when the fixing member 210b is used. The fixing member 210a attaches the laser scanner 310 to the housing 200 in a posture at 45 degrees. The fixing member 210b attaches the laser scanner 310 to the housing 200 in a posture at 90 degrees.

Here, it is possible to change the attachment angle of the laser scanner 310 with respect to the housing 200 by replacing an attachment target of the fixing member 2101 from the fixing member 210a to the fixing member 210b or from the fixing member 210b to the fixing member 210a.

When the attachment target of the fixing member 2101 is replaced from the fixing member 210a to the fixing member 210b, or from the fixing member 210b to the fixing member 210a, the position is decided using the pins 220 explained in FIG. 18. At this time, the screws are attached and detached as necessary.

Further, in FIG. 20, the receiving antenna 330 is installed on a ceiling of the housing 200 by using a bar-shaped member attached to the lower part at a height and a position so as not to block laser transmission light from the laser scanner 310.

The laser scanner 310 emits the laser transmission light radially within a scanning surface by rotating an emission direction of the laser transmission light by 360° on the scanning surface centering on the laser axis on a cylindrical axis.

The receiving antennas 330 are attached on the upper parts of the bar-shaped members 899 arranged in a vertical direction, at a position which is in a direction opposite to the line-of-sight direction of the two or three image pickup devices 320 and is more front side than a position, at which line-of-sight axes gather at one point, and does not interfere with the image pickup device 320.

When the laser scanner 310 is replaced and the angle of the laser scanner 310 is changed, the calibration (correction) information changes. Therefore, it is necessary to change the calibration information according to the attachment state of the laser scanner 310.

The calibration information includes: an attachment position of the laser scanner 310 with respect to a reference point (for example, a position of a center of gravity, a center, etc.) of the housing 200; a reference line-of-sight direction; an injection point of the laser light; and the like.

Further, the calibration information includes: an attachment position of the image pickup device 320 with respect to a reference point (for example, a position of a center of gravity, a center, etc.) of the housing 200; a reference line-of-sight direction; reference camera focal position; and the like.

Incidentally, sensor bias error caused by elapse of time in the inertial device 401 and bias error of the receiving device 402 are not included.

Besides, convenience is improved in a configuration in which specification information of the laser scanner 310 and attachment angle information are embedded in the fixing member 210a and the fixing member 210b in a manner like a two-dimensional code and then the information processing device 403 reads the two-dimensional code.

Further, the information processing device 403 may store identifier and calibration information corresponding to the identifier in advance, which improves convenience.

At this time, identifier for the laser scanner or identifier for the camera are each provided corresponding to attachment angles for N (N is an integer of 2 or more) of laser scanners 310 or attachment angles for M (M is an integer of 2 or more) of image pickup devices 320.

Using a computer inside the vehicle room which is connected to the information processing device 403, the identifier for the laser scanner or the identifier for the camera is selected corresponding to the attachment angles.
By this selection, the calibration information corresponding to each identifier is associated with the measurement data of the laser scanner 310, the captured image of the image pickup device 320, the measurement data of the inertial device 401, the measurement data of the odometer 5000, and the positioning signal data of the receiving device 402, and stored in the storage device.

In this case, the calibration information of the laser scanner 310 and the image pickup device 320 with respect to the inertial device 401 is uniquely associated with each attachment angle regardless of the measurement time.

Figure 22:
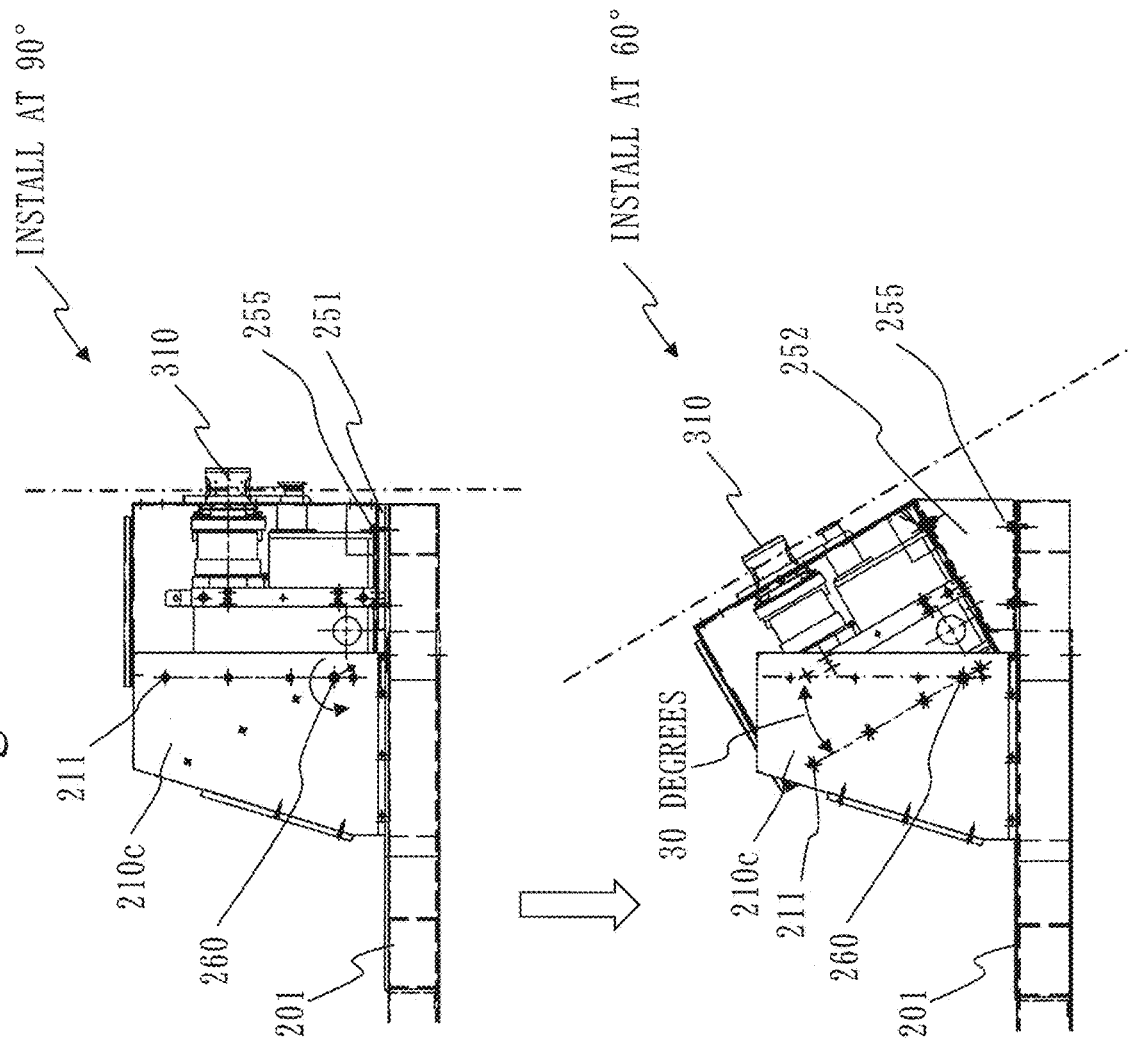
FIG. 22 is a diagram illustrating a case of changing an angle from 90 degrees to 60 degrees, which is a diagram of the first embodiment.

FIG. 22 illustrates a case of changing the attachment angle from 90 degrees to 60 degrees. With reference to FIG. 22, a configuration will be described, in which the attachment angle of the laser scanner 310 is changed to 90 degrees or 60 degrees. As illustrated in FIG. 22, it is possible to change the angle of the laser scanner 310 mounted at the back of the vehicle 500 from 90 degrees to 60 degrees or from 60 degrees to 90 degrees, depending on a purpose.
<Changing Method>

In order to give reproducibility to the attachment position and angle of the laser scanner 310, the laser scanner 310 is rotated centering on a rotation axis 260, and the angle is decided by the pedestal. A case of changing the attachment angle from 90 degrees to 60 degrees will be described below. The case of changing the attachment angle from 60 degrees to 90 degrees is the same as the case of changing the attachment angle from 90 degrees to 60 degrees.

FIG. 22 will be described.
(1) In a 90-degrees installation state, the laser scanner 310 is fixed to two fixing members 210c. The two fixing members 210c correspond to the two fixing members 210. A position deciding pedestal 251 is arranged between the laser scanner 310 and the top plate 201. The position deciding pedestal 251 is fixed to the top plate 201 by bolts 255. The laser scanner 310 is fixed to one fixing member 210c with four bolts 211 arranged in a straight line. Further, the rotation axis 260 pierces from one fixing member 210c illustrated in FIG. 22 to the other fixing member 210c not illustrated.
(2) When changing the laser scanner 310 to be at 60 degrees, the operator detaches the four bolts 211, detaches the pedestal 251, and rotates the laser scanner 310 centering on the rotation axis 260 by 30 degrees.
(3) The operator arranges a position deciding pedestal 252 between the laser scanner 310 and the top plate 201, and fixes the position deciding pedestal 252 to the top plate 201 with the bolts 255 in the same manner as the position deciding pedestal 251. On the fixing member 210c, four through holes are formed being arranged in a straight line at positions inclined by 30 degrees with respect to the four bolts 211 arranged in a straight line. The operator fit each bolt 211 into the four through holes, and fixes the laser scanner 310 to the fixing member 210c with the four bolts 211.
(4) 90 degrees can be changed to 60 degrees by the above (1) to (3).

Besides, when 90 degrees are effective, it is as follows. This is a case where a cross section and fine unevenness are measured by the laser scanner 310. This is a case where the tunnel shape and the road surface shape are measured by the laser scanner 310. When 60 degrees are effective, it is as follows. This is a case where it is desired to grasp the entire surrounding features. At 60 degrees, it is also possible to grasp road signs.

The case where 90 degrees and 60 degrees are effective will be specifically described with reference to FIGS. 23 and 24.

Figure 23:
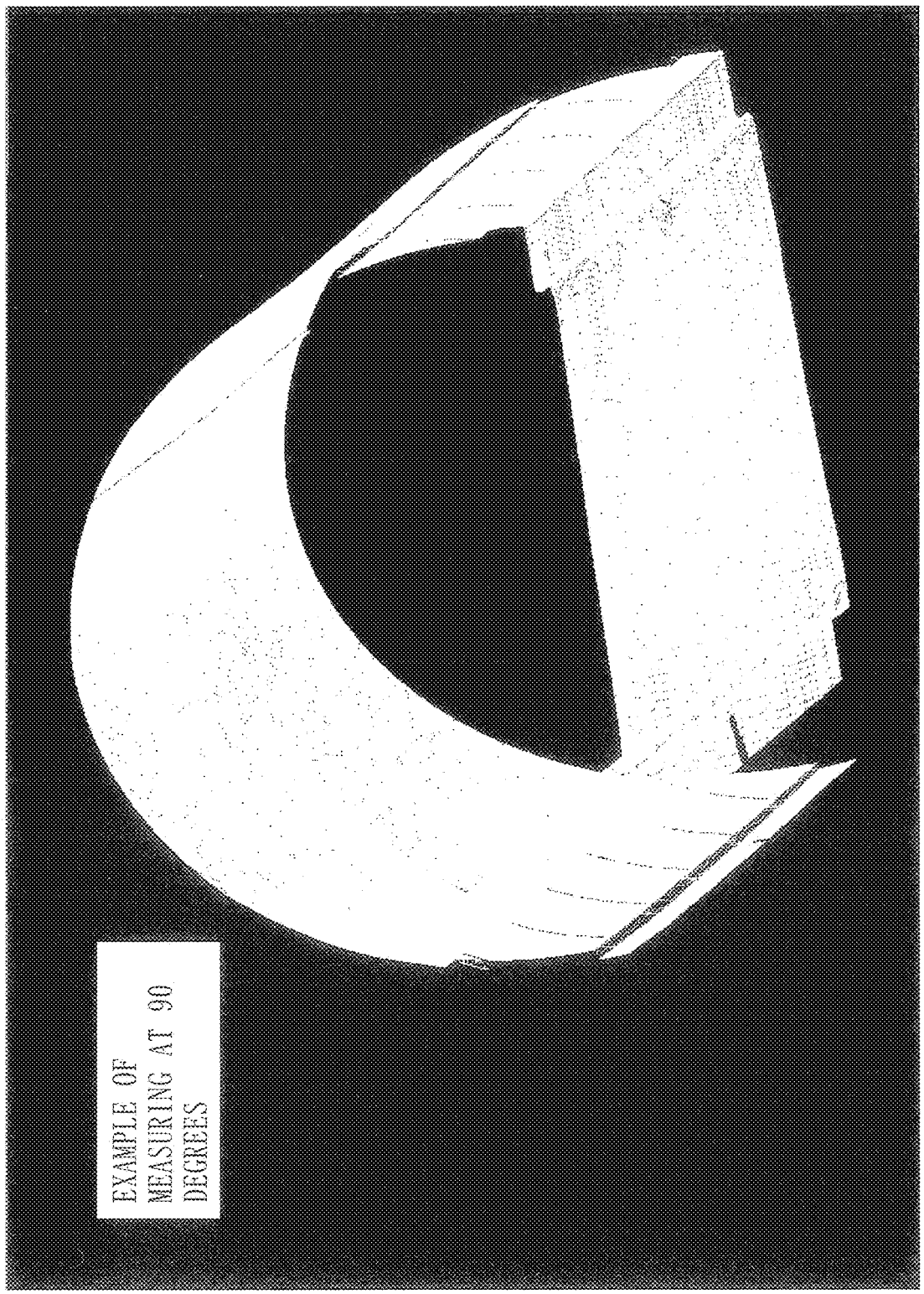
FIG. 23 is a diagram illustrating a case of measurement using a laser scanner at 90 degrees, which is a diagram of the first embodiment.

FIG. 23 illustrates an example of measuring at 90 degrees.
FIG. 24 illustrates an example of measuring at 60 degrees.
When point group data is acquired at 60 degrees for measurement of a tunnel in FIG. 23, a laser point group image is inclined diagonally, and thus scratches and unevenness on a wall surface and a road surface cannot be detected. Further, even if the scratches and the unevenness can be detected, their positions and heights are inaccurate, and there is a challenge that accurate measurement is difficult to carry out. On the other hand, as illustrated in FIG. 23, when the tunnel is measured at 90 degrees, the heights and widths are accurate since the tunnel is measured vertically by a laser.

Figure 24:
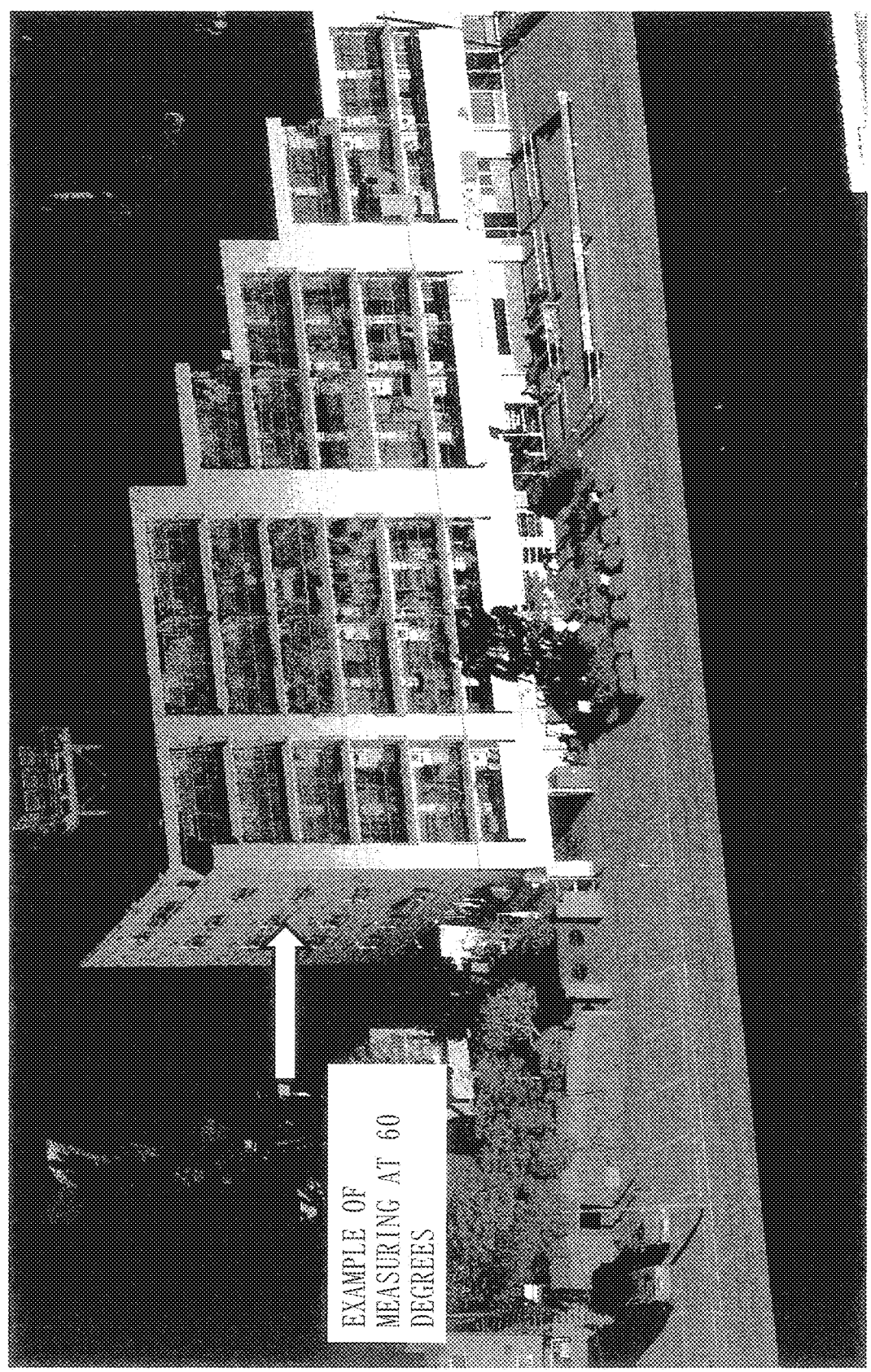
FIG. 24 is a diagram illustrating a case of measurement using the laser scanner at 60 degrees, which is a diagram of the first embodiment.

Further, in the building illustrated in FIG. 24, there is a challenge that data of a wall surface of a front side of the building cannot be acquired when the point group data is acquired at 90 degrees. On the other hand, as illustrated in FIG. 24, in a case of measuring the building at 60 degrees, front side data of the building can be acquired.

As described above, in order to improve the measurement accuracy, changing the angle of the laser scanner 310 has been a challenge. However, according to the measuring device of the present embodiment, the user can easily change the angle of the laser scanner by replacing the fixing member for fixing the optical sensor device. Therefore, the measuring device of the present embodiment has an effect of improving the measurement accuracy.

Effect of First Embodiment

<Mounting Capability of Measuring Device>
Although the measuring device 100 is integrated as a whole, it is a configuration in which the housing 200 which accommodates the control part 10, and the sensor part 20 can be separated from each other. Therefore, since the weight of the measuring device 100 can be separated when the measuring device 100 is mounted on the vehicle 500, it is possible to mount the measuring device 100 on the vehicle 500 by two passengers for the vehicle 500. For example, by separating the measuring device 100 with a weight of 490 N into 294 N and 196 N, it is possible to reduce the mounting weight at one time.

Further, the pins 70 are used for attaching the optical sensor device. Therefore, when the optical sensor device 301 is detached and reattached, the reproducibility of the attachment position can be ensured. As a result, when the optical sensor device 301 is separated from and reattached to the housing 200, calibration setting can be maintained, and thus it is possible to prevent from collapsing, the calibration between the optical sensor device 301 and the inertial device.

Since the optical sensor device 301 can be attached to and detached from the measuring device 100, when the optical sensor device 301 malfunctions, it is possible to detach and repair only the optical sensor device 301.

Besides, when the measuring device 100 is mounted, a weight of about 20 kg can be reduced by detaching from the housing 200, the laser scanner 310 as the optical sensor device 301. Further, since the image pickup device 320 can be separated into two or three, a weight of about 5 to 15 kg can be reduced by detaching from the housing 200, the image pickup device 320 as the optical sensor device 301.

<Replacement of Optical Sensor Device>

Since the attachment angle of the optical sensor device 301 can be changed in the measuring device 100, it is possible to support different types of sensors.

Since the attachment angle of the optical sensor device 301 can be changed in the measuring device 100, it is possible to change a detection range even with the same optical sensor device 301.

Since the measuring device 100 includes a position deciding member, it is possible to improve the mounting capability of the measuring device described above. An example of the position deciding member is the pin 220. Further, since the measuring device 100 includes the position deciding member, it is possible to ensure the reproducibility of the sensor measurement data and maintenance of the measurement accuracy when the optical sensor is attached and detached, or changed.

As described above, the measuring device includes the optical sensor device, the information processing device that processes information output by the optical sensor device, and the housing that has the position deciding member and at which the optical sensor device and the information processing device are arranged.

The position of the optical sensor device at the housing has been decided by the position deciding member, and the optical sensor device has been attached to the housing, and also the optical sensor device that has been in an attached state can be detached, and again the position at the housing can be decided by the position deciding member, and the optical sensor device can be attached to the housing.

The measuring device further includes a posture deciding member. As described above, the posture of the optical sensor device at the housing has been decided by the posture deciding member, and the optical sensor device has been attached to the housing, and also the optical sensor device that has been in an attached state can be detached, and again the posture at the housing can be decided by the posture deciding member, and the optical sensor device can be attached to the housing.

The position deciding member decides the position of the optical sensor device at the housing by combining with the posture deciding member. Here, an example of the position deciding member is a pin.

The weight of the measuring device in a state in which the optical sensor device has been detached is less than 500 N.

The optical sensor device is either the image pickup device or the laser scanner.

The attachment of the measuring device to the vehicle can be regarded as a method of installing the measuring device as follows.

That is,
it is grasped as a method of installing a measuring device to be mounted on a loading platform of a vehicle, the measuring device including:
an optical sensor device;
an information processing device to process information output by the optical sensor device; and
a housing that has a position deciding member and at which the optical sensor device and the information processing device are arranged, and
the method of installing the measuring device including:
a step of attaching to the loading platform of the vehicle, the housing in a state in which the optical sensor device has been separated from the housing; and
a step of attaching the optical sensor device to the housing via the position deciding member after attaching the housing.

Although the first embodiment has been described above, one of the first embodiments may be partially implemented. Alternatively, two or more of the first embodiments may be partially combined and implemented. Besides, the present invention is not limited to the first embodiment, and various modifications can be made as necessary.

REFERENCE SIGNS LIST

100: measuring device, 200: housing, 201: top plate, 202: through hole, 210, 210a, 210b, 210c: fixing member, 211: bolt, 212: through hole, 220: pin, 230: screw, 231, 232, 233, 234: handle, 251, 252: pedestal, 255: bolts, 260: rotation axis, 271: LAN wiring purpose terminal, 272: power supply wiring purpose terminal, 273: sensor connection purpose terminal, 274: aerotonometer connection purpose terminal, 275: heat radiating fin, 276: ventilation hole, 277: awning cover, 278: camera attachment pedestal, 279: awning cover, 300: sensor part, 301: optical sensor device, 310: laser scanner, 320: image pickup device, 330: receiving antenna, 340: base part, 400: control part, 401: inertial device, 402: receiving device, 403: information processing device, 500: vehicle, 600: handle, 2101: fixing member, 5000: odometer, 7000: holding part, 8000: groove.

The invention claimed is:

1. A measuring device comprising:
a laser scanner;
a fixing member to which the laser scanner is fixed;
a housing in which an information processing device, which processes information that the laser scanner outputs, and an inertial device are accommodated and to which the fixing member, to which the laser scanner is fixed, is fixed; and
a position deciding member having a shape that fixes an attachment position of the fixing member to the housing and thereby fixes an orientation angle of the laser scanner with respect to the housing by setting an inclination angle corresponding to the orientation angle,
wherein the fixing member to which the laser scanner is fixed is detachable from the housing in a state in which the laser scanner remains fixed to the fixing member, and
wherein the measuring device is mounted on the moving body or on a loading platform of the moving body, and is detachable from and attachable to the moving body.

2. The measuring device according to claim 1, further comprising:
a fastening member that fixes to the housing, the fixing member for which the attachment position at the housing is decided, and wherein the fixing member to which the laser scanner is fixed, is detachable from the housing in a state in which the laser scanner is fixed by the positioning member and the fastening member.

3. A measuring device comprising:
a laser scanner;
a fixing member to which the laser scanner is fixed;
a housing in which an information processing device, which processes information that the laser scanner outputs, and an inertial device are accommodated and to which the fixing member, to which the laser scanner is fixed, is fixed;
a position deciding member having a shape that fixes an attachment position of the fixing member to the housing and thereby fixes an orientation angle of the laser scanner with respect to the housing by setting an inclination angle corresponding to the orientation angle; and
a screw that fixes to the housing, the fixing member for which the attachment position at the housing is fixed,
wherein the fixing member to which the laser scanner is fixed is detachable from the housing in a state in which the laser scanner remains fixed to the fixing member,
wherein the position deciding member includes at least two pins.

4. The measuring device according to claim 1, wherein a weight of the measuring device in a state in which the laser scanner has been detached is less than 500 N.

5. The measuring device according to claim 2, wherein a weight of the measuring device in a state in which the laser scanner has been detached is less than 500 N.

6. The measuring device according to claim 3, wherein a weight of the measuring device in a state in which the laser scanner has been detached is less than 500 N.

7. The measuring device according to claim 1, wherein handles are attached to around each of the housing and the laser scanner.

8. The measuring device according to claim 2, wherein handles are attached to around each of the housing and the laser scanner.

9. The measuring device according to claim 3, wherein handles are attached to around each of the housing and the laser scanner.

10. The measuring device according to claim 4, wherein handles are attached to around each of the housing and the laser scanner.

11. The measuring device according to claim 5, wherein handles are attached to around each of the housing and the laser scanner.

12. The measuring device according to claim 6, wherein handles are attached to around each of the housing and the laser scanner.

13. A method of installing a measuring device,
in the method of installing the measuring device to be mounted on a loading platform of a vehicle, the measuring device comprising:
a laser scanner;
a fixing member to which the laser scanner is fixed; and
a housing in which an information processing device, which processes information that the laser scanner outputs, and an inertial device are accommodated and to which the fixing member, to which the laser scanner is fixed, is fixed; and
a position deciding member having a shape that fixes an attachment position of the fixing member to the housing and thereby fixes an orientation angle of the laser scanner with respect to the housing by setting an inclination angle corresponding to the orientation angle,
the method comprising:
attaching the housing to a loading platform of a vehicle in a state in which the fixing member, to which the laser scanner is fixed, is separated from the housing; and
fixing to the housing, the fixing member, to which the laser scanner is fixed, after the attaching of the housing to the loading platform of the vehicle.

* * * * *